(12) United States Patent
Ishigaki et al.

(10) Patent No.: US 7,005,398 B2
(45) Date of Patent: Feb. 28, 2006

(54) OLEFIN POLYMERIZATION CATALYST, CATALYST COMPONENT FOR OLEFIN POLYMERIZATION, METHOD OF STORING THESE, AND PROCESS FOR PRODUCING OLEFIN POLYMER

(75) Inventors: Satoru Ishigaki, Oita (JP); Shinji Hinokuma, Hachioji (JP)

(73) Assignee: SunAllomer Ltd., Tokyo (JP)

( * ) Notice: Subject to any disclaimer, the term of this patent is extended or adjusted under 35 U.S.C. 154(b) by 0 days.

(21) Appl. No.: 10/450,808

(22) PCT Filed: Dec. 19, 2001

(86) PCT No.: PCT/JP01/11154

§ 371 (c)(1),
(2), (4) Date: Jun. 18, 2003

(87) PCT Pub. No.: WO02/50134

PCT Pub. Date: Jun. 27, 2002

(65) Prior Publication Data

US 2004/0054102 A1  Mar. 18, 2004

(30) Foreign Application Priority Data

Dec. 19, 2000  (JP) ............................. 2000-385911

(51) Int. Cl.
*C08F 4/64* (2006.01)
*C08F 4/649* (2006.01)

(52) U.S. Cl. .................... 502/109; 502/103; 502/152; 502/158; 526/128; 526/133; 526/134; 526/160; 526/943

(58) Field of Classification Search ................ 502/103, 502/109, 152, 158; 526/128, 133, 134, 160, 526/943

See application file for complete search history.

(56) References Cited

U.S. PATENT DOCUMENTS 5,427,991 A    6/1995   Turner

FOREIGN PATENT DOCUMENTS

| EP | 277004 A | 1/1988 |
|----|----------|--------|
| EP | 710663 A | 10/1995 |
| EP | 0 798 315 A1 | 10/1997 |
| EP | 924226 A | 6/1999 |
| JP | 2000-212225 A | 8/2000 |
| WO | WO 96/34020 A | 10/1996 |
| WO | WO 96/41808 A | 12/1996 |

*Primary Examiner*—Caixia Lu
(74) *Attorney, Agent, or Firm*—Sughrue Mion, PLLC

(57) ABSTRACT

A catalyst is used which comprises a cocatalyst component wherein a non-coordinating ion-containing compound is chemically bonded to a fine particulate carrier, together with a metallocene compound and a specific hydrocarbon. There are provided an olefin polymerization catalyst which produces olefin polymers containing few solvent-soluble components without a wider molecular weight distribution, and which exhibits no significant reduction in activity even after storage, as well as olefin polymerization catalyst components and a method for their storage, and a process for production of propylene polymers using them.

13 Claims, 1 Drawing Sheet

(A) TRANSITION METAL COMPONENT (B) ORGANOMETALLIC COMPONENT (C) THIRD COMPONENT

HYDROCARBON

OLEFIN POLYMERIZATION CATALYST, CATALYST COMPONENT FOR OLEFIN POLYMERIZATION, METHOD OF STORING THESE, AND PROCESS FOR PRODUCING OLEFIN POLYMER

FIELD OF THE INVENTION

The present invention relates to an olefin polymerization catalyst, and to olefin polymerization catalyst components and a method for their storage. Particularly, the invention relates to an olefin polymerization catalyst which produces olefin polymers containing few solvent-soluble components and which exhibits no significant reduction in activity even after storage, to olefin polymerization catalyst components and a method for their storage, and to an olefin polymer production process.

BACKGROUND ART

It is known that non-coordinating ion-containing compounds can be used as cocatalyst components for metallocene catalysts and, for example, Japanese International Application Domestic Publication No. 1-502036 discloses production of olefin polymers with high polymer activity without the use of methylaluminoxane. Such catalyst systems, however, have poor stability and exhibit reduced activity when stored after their preparation, and they must therefore be used promptly after preparation.

One attempt at preventing reduction in activity after catalyst preparation has been to add a hydrocarbon compound which is inert with respect to the metallocene catalyst, as proposed in Japanese Unexamined Patent Publication No. 11-246614. This publication specifically discloses only methylaluminoxane as the cocatalyst component of the metallocene catalyst, and does not disclose the effect of using a non-coordinating ion-containing compound. According to the method described therein, it is difficult to prevent reduction in polymerization activity when using a non-coordinating ion-containing compound as the cocatalyst.

International Publication WO96/34020 discloses a catalyst comprising a metallocene compound, a non-coordinating ion-containing compound and a hydrocarbon compound which is inert with respect to the metallocene catalyst. The stability of the catalyst is not discussed in this publication, and again, it is difficult to prevent reduction in polymerization activity after preparation of the catalyst, while other problems arise in the case of olefin polymers, and particularly propylene polymer, including an increased content of solvent-soluble components and often a wider molecular weight distribution.

Thus, as a reduction in polymerization activity cannot be prevented simply by using an inert hydrocarbon in systems employing non-coordinating ion-containing compounds as cocatalysts, the aforementioned problems of such catalyst systems remain unsolved.

On the other hand, in publications such as International Publication WO96/41808 and Japanese International Application Domestic Publication No. 7-501573, there have been proposed olefin polymerization catalysts comprising a cocatalyst component wherein a non-coordinating ion-containing compound is chemically bonded to a fine particulate carrier, together with a metallocene compound and organic aluminum. However, such catalysts or cocatalysts undergo considerable alteration after preparation and exhibit reduced polymerization activity after storage and, thus, using such a stored catalyst or cocatalyst to produce an olefin polymer, and particularly a propylene polymer, results in increased content of the solvent-soluble component and a wider molecular weight distribution.

DISCLOSURE OF THE INVENTION

It is therefore an object of the present invention to provide an olefin polymerization catalyst, in a catalyst system employing a non-coordinating ion-containing compound as a cocatalyst, which can give olefin polymers containing few solvent-soluble components without a wider molecular weight distribution, and which exhibits no significant reduction in activity even after storage, as well as olefin polymerization catalyst components and a method for their storage, and an olefin polymer production process employing them.

As a result of much diligent research in light of the circumstances described above, the present inventors have completed the present invention upon finding that the aforementioned problems in a catalyst system employing a non-coordinating ion-containing compound as a cocatalyst can be effectively resolved by combination of a specific cocatalyst component, i.e. a cocatalyst component wherein a non-coordinating ion-containing compound is chemically bonded to a fine particulate carrier, and a specific hydrocarbon compound.

Specifically, the present invention provides:

1) An olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein the (D) hydrocarbon is at least one selected from the group consisting of the following (I) to (III):

(I) liquid hydrocarbons with a kinematic viscosity of 5.0 mm$^2$/s or greater at 30° C., (II) solid hydrocarbons other than crystalline olefin polymers, and (III) crystalline olefin polymers, 2) An olefin polymerization catalyst according to 1) above, wherein the (III) crystalline olefin polymers are one or more selected from the group consisting of the following (III-1) and (III-2):

(III-1) those wherein at least one olefin is prepolymerized by the olefin polymerization catalyst composed of (A), (B) and (C), with a melting point of 152.5° C. or below when the olefin is propylene, or the prepolymerization is conducted in a non-polymerizable medium, and (III-2) polyolefin waxes, 3) An olefin polymerization catalyst according to 1) or 2), wherein the (C) organometallic compound is used in a 10-fold molar amount with respect to the (B) metallocene compound, or else (D) is used in an amount of 15 parts by weight or greater to 100 parts by weight as the total of (A) and (B), 4) An olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein (A) is obtained by contacting a non-coordinating ion-containing compound (a-1) represented by the following general formula (1):

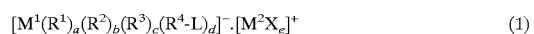 (1)

(wherein M¹ is boron or aluminum,

R¹, R² and R³ are each independently a $C_{1-20}$ hydrocarbon group, a halogenated hydrocarbon group, an alkoxy group, a phenoxy group or a halogen atom, and may be the same or different, R⁴ is a $C_{1-20}$ hydrocarbon group optionally containing a hetero atom, L is selected from among silyl, hydroxyl, carboxyl, amino, alkoxy, aryloxy and phosphino groups and alkyl or aryl groups having one or more of these groups, a, b and c are 0 or integers of 1–3, d is an integer of 1–4 and a+b+c+d=4, $[M^2X_3]^+$ represents a monovalent cation, M² is a cation of valence (e+1), X is any desired anion, and e is a integer of 0–3) with a fine particulate carrier (a-2), and the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, 5) An olefin polymerization catalyst component comprising (A) a cocatalyst component wherein a non-coordinating ion-containing compound is chemically bonded to a fine particulate carrier, (B) a metallocene compound and (D) a hydrocarbon, wherein the (D) hydrocarbon is at least one selected from the group consisting of the following (I), (II) and (III-2):

(I) liquid hydrocarbons with a kinematic viscosity of 5.0 mm²/s or greater at 30° C., (II) solid hydrocarbons other than crystalline olefin polymers, and (III-2) polyolefin waxes, 6) A method for storing an olefin polymerization catalyst, whereby an olefin polymerization catalyst comprising (A) a cocatalyst component wherein a non-coordinating ion-containing compound is chemically bonded to a fine particulate carrier, (B) a metallocene compound and (C) organic aluminum is stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, 7) A method for storing an olefin polymerization catalyst component, whereby an olefin polymerization catalyst component comprising (A) a cocatalyst component wherein a non-coordinating ion-containing compound is chemically bonded to a fine particulate carrier and (B) a metallocene compound is stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, 8) A process for producing an olefin polymer whereby propylene is homopolymerized or copolymerized with one or more other olefins using an olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, to produce a propylene polymer with a weight-average molecular weight of 50,000 or greater.

9) A process for producing an olefin polymer according to 8), wherein the (III) crystalline olefin polymers are one or more selected from the group consisting of the following (III-1) and (III-2):

(III-1) those wherein at least one olefin is prepolymerized by the olefin polymerization catalyst composed of (A), (B) and (C), or when the olefin is propylene, it is prepolymerized in a medium with a melting point of 152.5° C. or below or a non-polymerizable medium, and (III-2) polyolefin waxes, 10) A process for producing an olefin polymer whereby an olefin polymer is produced by polymerizing one or more different olefins using an olefin polymerization catalyst comprising (A) a cocatalyst component wherein a non-coordinating ion-containing compound is chemically bonded to a fine particulate carrier, (B) a metallocene compound and (C) an organometallic compound, the catalyst being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, 11) A process for producing an olefin polymer whereby a propylene polymer is produced by homopolymerizing propylene or copolymerizing propylene with at least one other olefin using an olefin polymerization catalyst comprising (A) a cocatalyst component wherein a non-coordinating ion-containing compound is chemically bonded to a fine particulate carrier, (B) a metallocene compound and (C) an organometallic compound, the catalyst being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, 12) A process for producing an olefin polymer whereby an olefin polymer is produced by polymerizing one or more different olefins using an olefin polymerization catalyst which comprises a catalyst component comprising (A) a cocatalyst component wherein a non-coordinating ion-containing compound is chemically bonded to a fine particulate carrier and (B) a metallocene compound, the catalyst component being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, and (C) an organometallic compound, and 13) A process for producing an olefin polymer whereby a propylene polymer is produced by homopolymerizing propylene or copolymerizing propylene with at least one other olefin using an olefin polymerization catalyst which comprises a catalyst component comprising (A) a cocatalyst component wherein a non-coordinating ion-containing compound is chemically bonded to a fine particulate carrier and (B) a metallocene compound, the catalyst component being stored in (D) a hydrocarbon, wherein the (D) hydrocarbon is at least one selected from the group consisting of the following (I) to (III):

(I) liquid hydrocarbons with a kinematic viscosity of 5.0 mm$^2$/s or greater at 30° C., (II) solid hydrocarbons other than crystalline olefin polymers, and (III) crystalline olefin polymers, and (C) an organometallic compound.

BEST MODE FOR CARRYING OUT THE INVENTION

Figure 1:
FIG. 1 is a flow chart showing a catalyst system according to the invention.
Figure 1:
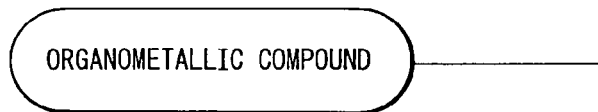
Figure 1:
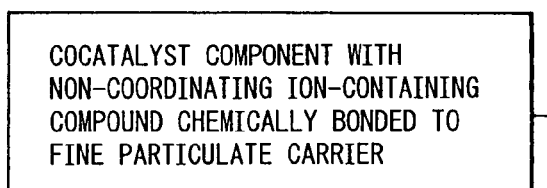
Figure 1:

The present invention will now be explained in detail.

Component (A) in the invention is a component wherein a non-coordinating ion-containing compound used as a cocatalyst for a metallocene catalyst is chemically bonded to a fine particulate carrier. The chemical bonding may be covalent, ionic or coordinated bonding. Such chemical bonding of an ionic compound to the fine particulate carrier has been shown to notably prevent fouling and cohesion between polymer particles, and to exhibit a major effect for bulk polymerization in particular. In addition, the storage stability of the catalyst is improved, while it is possible to prevent an increased molecular weight distribution, or solvent-soluble components, or reduced polymerization activity, even when using a stored catalyst.

This is described, for example, in Japanese International Application Domestic Publication No. 7-501573, Japanese Unexamined Patent Publication No. 8-143617, International Publications WO96/40796, WO96/41808 and WO97/19959, and Japanese Unexamined Patent Publication No. 2000-212225, including (1) a method of preparation by contacting a carrier compound with a non-coordinating ion-containing compound which is reactive with the carrier, (2) a method of preparation by forming a carrier from a non-coordinating ion-containing compound having a functional group capable of forming a carrier, and if necessary a carrier precursor, and (3) a method of producing a non-coordinating ion-containing compound on a carrier by reacting a non-coordinating ion-containing compound precursor with the carrier.

A specific example of (1) is a method of contacting a non-coordinating ion-containing compound having a halogenated silyl group or an acid anhydride or acid chloride group with a hydroxyl group-containing carrier such as silica or alumina. Another example is a method of contacting a non-coordinating ion-containing compound having a hydroxyl group or phenoxy group with a carrier such as silica or alumina treated with chlorosilane or organic aluminum. Yet another example is a method of contacting a non-coordinating ion-containing compound having an electron donor group such as an alkoxy, alkoxysilyl or amino group, with an electron accepting carrier such as magnesium chloride or alumina.

A specific example of (2) is a method of forming a carrier by homopolymerization or copolymerization of non-coordinating ion-containing compounds having polymerizable groups such as vinyl groups. Another example is a method of forming a carrier by condensation of a non-coordinating ion-containing compound having a condensable group such as an alkoxysilyl group, either alone or with another alkoxysilane or the like.

A specific example of (3) is a method of producing a non-coordinating ion-containing compound by reacting a non-coordinating ion-containing compound precursor such as a triarylborane with a carrier such as metallized polystyrene or the like.

The presence or absence of the chemical bonding can be detected, for example, by measuring whether or not the non-coordinating ion-containing compound or the boron atoms, etc. present in the compound remain on the fine particulate carrier after washing at room temperature with a polar solvent such as dichloromethane which is inert with respect to the non-coordinating ion-containing compound and carrier.

Component (A) is preferably obtained by contacting a non-coordinating ion-containing compound (a-1) represented by general formula (1) below with a fine particulate carrier (a-2).

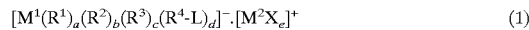

$$[M^1(R^1)_a(R^2)_b(R^3)_c(R^4\text{-}L)_d]^- \cdot [M^2X_e]^+ \quad (1)$$

In the formula, $M^1$ is boron or aluminum, and is preferably boron.

$R^1$, $R^2$ and $R^3$ are each independently a $C_{1-20}$ hydrocarbon group, a halogenated hydrocarbon group, an alkoxy group, a phenoxy group or a halogen atom, and they may be the same or different. As hydrocarbon groups there may be mentioned alkyl groups such as methyl, ethyl, n-propyl, i-propyl, n-butyl, i-butyl and t-butyl, aryl groups such as phenyl, tolyl and dimethylphenyl, and halogenated aryl groups. As alkoxy groups there may be mentioned methoxy, ethoxy and propoxy. Preferred among these are alkyl, aryl and halogenated aryl groups, with aryl and halogenated aryl groups being particularly preferred.

As specific examples of halogenated aryl groups there may be mentioned fluorophenyl groups such as 4-fluorophenyl, difluorophenyl groups such as 2,4-difluorophenyl and 3,5-difluorophenyl, trifluorophenyl groups such as 2,4,5-trifluorophenyl and 2,4,6-trifluorophenyl, tetrafluorophenyl groups such as 2,3,5,6-tetrafluorophenyl, pentafluorophenyl groups, bis(trifluoromethyl)phenyl groups such as 3,4-bis(trifluoromethyl)phenyl and 3,5-bis(trifluoromethyl)phenyl, tris(trifluoromethyl)phenyl groups such as 2,3,5-tris(trifluoromethyl)phenyl and 2,4,6-tris(trifluoromethyl)phenyl, tetrakis(trifluoromethyl)phenyl groups such as 2,3,5,6-tetrakis(trifluoromethyl)phenyl, pentakis(trifluoromethyl)phenyl groups, and these groups having the fluorine atoms replaced with other halogen atoms such as chlorine or bromine.

Among these halogenated aryl groups there are preferred fluorophenyl groups such as trifluorophenyl, tetrafluorophenyl and pentafluorophenyl and bis(trifluoromethyl)phenyl groups such as 3,5-bis(trifluoromethyl)phenyl, with tetrafluorophenyl and pentafluorophenyl being more preferred, and pentafluorophenyl being especially preferred.

In the ionic compound (a-1), $R^4$ is a $C_{1-20}$ hydrocarbon group optionally containing a hetero atom, and specifically there may be mentioned methylene, ethylene, propylene, butylene, ethylidene, propylidene, o-phenylene, m-phenylene, p-phenylene, bis(trifluoromethyl)phenylene groups such as 3,5-bis(trifluoromethyl)-p-phenylene, fluorophenylene groups such as 4-fluoro-m-phenylene and 2-fluoro-p-phenylene, difluorophenylene groups such as 4,5-difluoro-m-phenylene and 3,5-difluoro-p-phenylene, trifluorophenylene groups such as 2,4,5-trifluoro-m-phenylene, 2,4,6-trifluoro-m-phenylene, 4,5,6-trifluoro-m-phenylene, 2,3,5-trifluoro-p-phenylene and 2,3,6-trifluoro-p-phenylene, tetrafluorophenylene groups such as 3,4,5,6-tetrafluoro-o-phenylene, 2,4,5,6-tetrafluoro-m-phenylene and 2,3,5,6-tetrafluoro-p-phenylene, oxyarylene groups such as oxyphenylene and oxytetrafluorophenylene and iminoarylene groups such as iminophenylene.

Preferred among these are 2,4,5-trifluoro-m-phenylene, 2,4,6-trifluoro-m-phenylene, 4,5,6-trifluoro-m-phenylene, 2,3,5-trifluoro-p-phenylene, 2,3,6-trifluoro-p-phenylene, 3,4,5,6-tetrafluoro-o-phenylene, 2,4,5,6-tetrafluoro-m-phenylene and 2,3,5,6-tetrafluoro-p-phenylene, with 2,4,5,6-tetrafluoro-m-phenylene and 2,3,5,6-tetrafluoro-p-phenylene being particularly preferred.

As an example of $R_4$ there may be mentioned the group represented by -Ar-$R^8$—, where Ar is o-, m- or p-phenylene or o-, m- or p-tetrafluorophenylene, and $R^8$ is a substituted or unsubstituted $C_{1-20}$ hydrocarbon group. More specific examples include —$C_6H_4CH_2$—, —$C_6H_4CH_2CH_2$— and —$C_6F_4CH_2$—.

In the ionic compound (a-1), L is selected from among silyl, hydroxyl, carboxyl, amino, alkoxy, aryloxy and phosphino groups and alkyl or aryl groups having one or more of these groups, and it is preferably silyl or hydroxyl. As silyl groups there may be mentioned those represented by the following general formula (2):

$$—[Si(Z^1Z^2)\text{-}Z^6\text{-}]_n SiZ^3Z^4Z^5 \qquad (2)$$

In general formula (2), $Z^1$, $Z^2$, $Z^3$, $Z^4$ and $Z^5$ are selected from among halogen atoms, alkoxy groups, aryloxy groups, acyloxy groups, amide groups and $C_{1-20}$ hydrocarbon groups, and at least one from among $Z^3$, $Z^4$ and $Z^5$ is a halogen atom, alkoxy group, aryloxy group, acyloxy group or amide group. $Z^6$ is an oxygen atom, imino group, $C_{1-20}$ alkylene group, $C_{1-20}$ arylene group or $C_{1-20}$ oxyalkylene group. The letter n represents 0 or an integer of 1–10.

As specific examples of silyl groups there may be mentioned trihalogenosilyl groups such as trichlorosilyl, alkyldihalogenosilyl groups such as methyldichlorosilyl and ethyldichlorosilyl, dialkylhalogenosilyl groups such as dimethylchlorosilyl and diethylchlorosilyl, aryldihalogenosilyl groups such as phenyldichlorosilyl and p-tolyldichlorosilyl, diarylhalogenosilyl groups such as diphenylchlorosilyl, alkoxy group-containing silyl groups including trialkoxysilyl groups such as trimethoxysilyl and triethoxysilyl, alkyldialkoxysilyl groups such as methyldimethoxysilyl, dialkylalkoxysilyl groups such as dimethylmethoxysilyl and dimethylethoxysilyl, aryldialkoxysilyl groups such as phenyldimethoxysilyl and tolyldimethoxysilyl, diarylalkoxysilyl groups such as diphenylmethoxysilyl, ditolylmethoxysilyl and diphenylethoxysilyl, triacyloxysilyl groups such as triacetoxysilyl, alkyldiacyloxysilyl groups such as methyldiacetoxysilyl, dialkylacyloxysilyl groups such as dimethylacetoxysilyl, aryldiacyloxysilyl groups such as phenyldiacetoxysilyl, diarylacyloxysilyl groups such as diphenylacetoxysilyl, alkylhydroxysilyl groups such as dimethylhydroxysilyl, and aryloxy group-containing silyl groups.

Preferred among these are trichlorosilyl, methyldichlorosilyl, dimethylchlorosilyl, trimethoxysilyl, methyldimethoxysilyl, dimethylmethoxysilyl, triethoxysilyl, methyldiethoxysilyl, dimethylethoxysilyl, triacetoxysilyl, methyldiacetoxysilyl, dimethylacetoxysilyl, trihydroxysilyl, methyldihydroxysilyl and dimethylhydroxysilyl, with trichlorosilyl, methyldichlorosilyl and dimethylchlorosilyl being particularly preferred.

Examples of silyl group-containing alkyl groups include silylmethyl groups such as (trichlorosilyl)methyl, (methyldichlorosilyl)methyl, (dimethylchlorosilyl)methyl, (trimethoxysilyl)methyl, (methyldimethoxysilyl)methyl, (dimethylmethoxysilyl)methyl, (triethoxysilyl)methyl, (methyldiethoxysilyl)methyl and (dimethylethoxysilyl)methyl, and silylethyl groups such as (trichlorosilyl)ethyl, (methyldichlorosilyl)ethyl, (dimethylchlorosilyl)ethyl, (trimethoxysilyl)ethyl, (methyldimethoxysilyl)ethyl, (dimethylmethoxysilyl)ethyl, (triethoxysilyl)ethyl, (methyldiethoxysilyl)ethyl and (dimethylethoxysilyl)ethyl Examples of silyl group-containing aryl groups include silylphenyl groups such as (trichlorosilyl)phenyl, (methyldichlorosilyl)phenyl, (dimethylchlorosilyl)phenyl, (trimethoxysilyl)phenyl, (methyldimethoxysilyl)phenyl, (dimethylmethoxysilyl)phenyl, (triethoxysilyl)phenyl, (methyldiethoxysilyl)phenyl and (dimethylethoxysilyl)phenyl, and silylethyl groups such as (trichlorosilyl)ethyl, (methyldichlorosilyl)ethyl, (dimethylchlorosilyl)ethyl, (trimethoxysilyl)ethyl, (methyldimethoxysilyl)ethyl, (dimethylmethoxysilyl)ethyl, (triethoxysilyl)ethyl, (methyldiethoxysilyl)ethyl and (dimethylethoxysilyl)ethyl.

Amino groups include dimethylamino, diethylamino, methylamino, ethylamino, anilino, methylanilino, pyrrolidino, piperidino, piperazino, imidazolyl, pyridyl, quinolino and the like. Alkoxy groups include methoxy, ethoxy, isopropoxy, butoxy, trifluoroethyl, ethylene-1,2-dioxy and the like. Aryloxy groups include phenoxy, naphthoxy, methylphenoxy, dimethylphenoxy, pentafluorophenoxy and the like.

In the ionic compound (a-1), a, b and c are 0 or integers of 1–3, d is an integer of 1–4 and a+b+c+d=4. Most preferred are compounds wherein d=1.

In the ionic compound (a-1), $[M^2X_3]^+$ represents a monovalent cation, wherein $M^2$ is a cation of valence (e+1), X is any desired anion, and e is a integer of 0–3.

As specific examples of $M^2$ there may be mentioned protons, carbenium ions including triarylcarbenium ions such as triphenylcarbenium ion and tri(p-tolyl)carbenium ion, or trimethylcarbenium ion, tropylium ion, ferrocenium ion, ammonium ions such as trimethylammonium ion, tri-n-butylammonium ion and N,N-dimethylanilinium ion, pyridinium ions such as pyridinium ion, 4-methylpyridinium ion, 2-cyanopyridinium ion and 4-cyanopyridinium ion, oxonium ions such as trimethyloxonium ion and triethyloxonium ion, silylium ions such as trimethylsilylium ion and triethylsilylium ion, alkali metal ions such as lithium, sodium and potassium, alkaline earth metal ions such as magnesium and calcium, metal ions such as aluminum, zinc, iron and titanium, and phosphonium.

Specific examples of X include halide ions such as fluorine, chlorine, bromine and iodine, alkoxides or aryloxides such as methoxide, ethoxide and phenoxide, and carboxylate ions such as acetate ion, propionate ion, butyrate ion and benzoate ion.

In the ionic compound (a-1), e is preferably 0, and specifically there may be mentioned protons, carbenium ions including triarylcarbenium ions such as triphenylcarbenium ion and tri(p-tolyl)carbenium ion, or trimethylcarbenium ion, tropylium ion, ferrocenium ion, ammonium ions such as trimethylammonium ion, tri-n-butylammonium ion and N,N-dimethylanilinium ion, pyridinium ions such as pyridinium ion, 4-methyl pyridinium ion, 2-cyanopyridinium ion and 4-cyanopyridinium ion, oxonium ions such as trimethyloxonium ion and triethyloxonium ion, silylium ions such as trimethylsilylium ion and triethylsilylium ion, and alkali metal ions such as lithium, sodium and potassium.

Particularly preferred among these are protons, triarylcarbenium ions such as triphenylcarbenium ion and tri(p-tolyl)carbenium ion, dialkyl anilinium ions such as N,N-dimethylanilinium ion and N,N-diethylanilinium ion, trialkylammonium ions such as tri-n-butylammonium ion, trialkyloxonium ions such as trimethyloxonium ion and triethyloxonium ion, and silylium ions such as trimethylsilylium ion and triethylsilylium ion. Most preferred among these are dialkylanilinium ions.

Specific examples of the ionic compound (a-1) to be preferably used for the invention include the following having halogenated silyl groups:

N,N-dimethylanilinium[4-(chlorodimethylsilyl)-2,3,5,6-tetrafluorophenyl]tris(pentafluorophenyl)borate,
N,N-dimethylanilinium[4-(methyldichlorosilyl)-2,3,5,6-tetrafluorophenyl]tris(pentafluorophenyl)borate,
N,N-dimethylanilinium(4-trichlorosilyl-2,3,5,6-tetrafluorophenyl)tris(pentafluorophenyl)borate,
N,N-dimethylanilinium[4-(chlorodiethylsilyl)-2,3,5,6-tetrafluorophenyl]tris(pentafluorophenyl)borate,
N,N-dimethylanilinium[4-(ethyldichlorosilyl)-2,3,5,6-tetrafluorophenyl]tris(pentafluorophenyl)borate,
tri-n-butylammonium[4-(chlorodimethylsilyl)-2,3,5,6-tetrafluorophenyl]tris(pentafluorophenyl)borate,
tri-n-butylammonium[4-(methyldichlorosilyl)-2,3,5,6-tetrafluorophenyl]tris(pentafluorophenyl)borate,
tri-n-butylammonium(4-trichlorosilyl-2,3,5,6-tetrafluorophenyl)tris(pentafluorophenyl)borate,
tri-n-butylammonium[4-(chlorodiethylsilyl)-2,3,5,6-tetrafluorophenyl]tris(pentafluorophenyl)borate,
tri-n-butylammonium[4-(ethyldichlorosilyl)-2,3,5,6-tetrafluorophenyl]tris(pentafluorophenyl)borate,
triphenylcarbenium[4-(chlorodimethylsilyl)-2,3,5,6-tetrafluorophenyl]tris(pentafluorophenyl)borate,
triphenylcarbenium[4-(methyldichlorosilyl)-2,3,5,6-tetrafluorophenyl]tris(pentafluorophenyl)borate,
triphenylcarbenium(4-trichlorosilyl-2,3,5,6-tetrafluorophenyl)tris(pentafluorophenyl)borate,
triphenylcarbenium[4-(chlorodiethylsilyl)-2,3,5,6-tetrafluorophenyl]tris(pentafluorophenyl)borate, and
triphenylcarbenium[4-(ethyldichlorosilyl)-2,3,5,6-tetrafluorophenyl]tris(pentafluorophenyl)borate.

Additional examples include the following:
N,N-dimethylanilinium[4-(chlorodimethylsilyl)phenyl]tris(pentafluorophenyl)borate,
N,N-dimethylanilinium[4-(methyldichlorosilyl)phenyl]tris(pentafluorophenyl)borate,
N,N-dimethylanilinium(4-trichlorosilyl)phenyl)tris(pentafluorophenyl)borate,
N,N-dimethylanilinium[4-(chlorodiethylsilyl)phenyl]tris(pentafluorophenyl)borate,
N,N-dimethylanilinium[4-(ethyldichlorosilyl)phenyl]tris(pentafluorophenyl)borate,
tri-n-butylammonium[4-(chlorodimethylsilyl)phenyl]tris(pentafluorophenyl)borate,
tri-n-butylammonium[4-(methyldichlorosilyl)phenyl]tris(pentafluorophenyl)borate,
tri-n-butylammonium(4-trichlorosilylphenyl)tris(pentafluorophenyl)borate,
tri-n-butylammonium[4-(chlorodiethylsilyl)phenyl]tris(pentafluorophenyl)borate,
tri-n-butylammonium[4-(ethyldichlorosilyl)phenyl]tris(pentafluorophenyl)borate,
triphenylcarbenium[4-(chlorodimethylsilyl)phenyl]tris(pentafluorophenyl)borate,
triphenylcarbenium[4-(methyldichlorosilyl)phenyl]tris(pentafluorophenyl)borate,
triphenylcarbenium(4-trichlorosilylphenyl)tris(pentafluorophenyl)borate,
triphenylcarbenium[4-(chlorodiethylsilyl)phenyl]tris(pentafluorophenyl)borate, and
triphenylcarbenium[4-(ethyldichlorosilyl)phenyl]tris(pentafluorophenyl)borate.

Yet more additional examples include the following:
N,N-dimethylanilinium[4-(chlorodimethylsilyl)phenyl] tris[3,5-bis(trifluoromethyl)phenyl]borate,
N,N-dimethylanilinium[4-(methyldichlorosilyl)phenyl]tris[3,5-bis(trifluoromethyl)phenyl]borate,
N,N-dimethylanilinium(4-trichlorosilylphenyl)tris[3,5-bis(trifluoromethyl)phenyl]borate,
N,N-dimethylanilinium[4-(chlorodiethylsilyl)phenyl]tris[3,5-bis(trifluoromethyl)phenyl]borate,
N,N-dimethylanilinium[4-(ethyldichlorosilyl)phenyl]tris[3,5-bis(trifluoromethyl)phenyl]borate,
tri-n-butylammonium[4-(chlorodimethylsilyl)phenyl]tris[3,5-bis(trifluoromethyl)phenyl]borate,
tri-n-butylammonium[4-(methyldichlorosilyl)phenyl]tris[3,5-bis(trifluoromethyl)phenyl]borate,
tri-n-butylammonium(4-trichlorosilylphenyl)tris[3,5-bis(trifluoromethyl)phenyl]borate,
tri-n-butylammonium[4-(chlorodiethylsilyl)phenyl]tris[3,5-bis(trifluoromethyl)phenyl]borate,
tri-n-butylammonium[4-(ethyldichlorosilyl)phenyl]tris[3,5-bis(trifluoromethyl)phenyl]borate,
triphenylcarbenium[4-(chlorodimethylsilyl)phenyl]tris[3,5-bis(trifluoromethyl)phenyl]borate,
triphenylcarbenium[4-(methyldichlorosilyl)phenyl]tris[3,5-bis(trifluoromethyl)phenyl]borate,
triphenylcarbenium(4-trichlorosilyl-phenyl)tris[3,5-bis(trifluoromethyl)phenyl]borate,
triphenylcarbenium[4-(chlorodiethylsilyl)phenyl]tris[3,5-bis(trifluoromethyl)phenyl]borate, and
triphenylcarbenium[4-(ethyldichlorosilyl)phenyl]tris[3,5-bis(trifluoromethyl)phenyl]borate.

Specific examples for the ionic compound (a-1) to be preferably used for the invention also include the following having alkoxysilyl groups:
N,N-dimethylanilinium[4-(methoxydimethylsilyl)-2,3,5,6-tetrafluorophenyl]tris(pentafluorophenyl)borate,
N,N-dimethylanilinium[4-(methyldimethoxysilyl)-2,3,5,6-tetrafluorophenyl]tris(pentafluorophenyl)borate,
N,N-dimethylanilinium(4-methoxysilyl-2,3,5,6 -tetrafluorophenyl)tris(pentafluorophenyl)borate,
N,N-dimethylanilinium[4-(methoxydiethylsilyl)-2,3,5,6-tetrafluorophenyl]tris(pentafluorophenyl)borate,
N,N-dimethylanilinium[4-(ethyldimethoxysilyl)-2,3,5,6-tetrafluorophenyl]tris(pentafluorophenyl)borate,
tri-n-butylammonium[4-(ethoxydimethylsilyl)-2,3,5,6-tetrafluorophenyl]tris(pentafluorophenyl)borate,
tri-n-butylammonium[4-(methyldiethoxysilyl)-2,3,5,6-tetrafluorophenyl]tris(pentafluorophenyl)borate,
tri-n-butylammonium(4-triethoxysilyl-2,3,5,6-tetrafluorophenyl)tris(pentafluorophenyl)borate,
tri-n-butylammonium[4-(ethoxydiethylsilyl)-2,3,5,6-tetrafluorophenyl]tris(pentafluorophenyl)borate,
tri-n-butylammonium[4-(ethyldiethoxysilyl)-2,3,5,6-tetrafluorophenyl]tris(pentafluorophenyl)borate, triphenylcarbenium[4-(ethoxydimethylsilyl)-2,3,5,6-tetrafluorophenyl]tris(pentafluorophenyl)borate,
triphenylcarbenium[4-(methyldiethoxysilyl)-2,3,5,6-tetrafluorophenyl]tris(pentafluorophenyl)borate,
triphenylcarbenium(4-triethoxysilyl-2,3,5,6-tetrafluorophenyl)tris(pentafluorophenyl)borate,
triphenylcarbenium[4-(ethoxydiethylsilyl)-2,3,5,6-tetrafluorophenyl]tris(pentafluorophenyl)borate, and
triphenylcarbenium[4-(ethyldiethoxysilyl)-2,3,5,6-tetrafluorophenyl]tris(pentafluorophenyl)borate.

Specific examples for the ionic compound (a-1) to be preferably used for the invention also include the following having groups other than halogenated silyl groups and alkoxysilyl groups:
N,N-dimethylanilinium(4-hydroxy-2,3,5,6-tetrafluorophenyl)tris(pentafluorophenyl)borate,
N,N-dimethylanilinium(4-hydroxyphenyl)tris(pentafluorophenyl)borate,
tri-n-butylammonium(4-hydroxy-2,3,5,6-tetrafluorophenyl)tris(pentafluorophenyl)borate, and
tri-n-butylammonium(4-hydroxyphenyl)tris(pentafluorophenyl)borate.

As fine particulate carriers to be used in the olefin polymerization catalyst of the invention there may be mentioned metal oxides, metal halides, metal hydroxides, metal alkoxides, carbonates, sulfates, acetates, silicates and organic polymer compounds. They may be used either alone or in combinations, depending on the need. They may also be treated with organic aluminum or organic silicon compounds.

As examples of metal oxides there may be mentioned silica, alumina, titania, magnesia, zirconia, calcia, zinc oxide and the like. As examples of metal halides there may be mentioned magnesium chloride, calcium chloride, barium chloride, sodium chloride and the like. As examples of metal hydroxides there may be mentioned aluminum hydroxide, magnesium hydroxide and the like. As examples of metal alkoxides there may be mentioned magnesium ethoxide, magnesium methoxide and the like.

As examples of carbonates there may be mentioned calcium carbonate, basic calcium carbonate, magnesium carbonate, basic magnesium carbonate, barium carbonate and the like. As examples of sulfates there may be mentioned calcium sulfate, magnesium sulfate, barium sulfate and the like. As examples of acetates there may be mentioned calcium acetate, magnesium acetate and the like. As examples of silicates there may be mentioned magnesium silicates such as mica and talc, calcium silicates, sodium silicates and the like. Preferred among these are silica, alumina and silicates, including magnesium silicates such as mica and talc, calcium silicates, aluminum silicates, sodium silicates and the like.

As examples of organic polymer compounds there may be mentioned thermoplastic resins including polyolefins such as polyethylene, polypropylene, ethylene-propylene copolymer, ethylene-vinyl ester copolymer and partial or fully saponified ethylene-vinyl ester copolymer, as well as their modified forms, polystyrene, polystyrene with functional groups such as hydroxyl, crosslinked polystyrene, crosslinked polystyrene with functional groups such as hydroxyl, polyamides, polycarbonates, polyesters and the like, and thermosetting resins such as phenol resins, epoxy resins, urea resins, melamine resins and the like.

Preferred among these for (a-2) are metal oxides such as silica and alumina, metal halides such as magnesium chloride, metal hydroxides such as aluminum hydroxide, silicates such as aluminum silicate, and polymer compounds with polar groups such as hydroxyl, carboxyl, amino, amide and the like, among which metal oxides such as silica and alumina, silicates such as aluminum silicate and metal hydroxides such as aluminum hydroxide are most preferred.

The most preferred hydroxyl group content for (a-2) will generally be 0.1 mmol/g or greater, preferably 0.3 mmol/g or greater, more preferably 0.5 mmol/g or greater, even more preferably 0.6 mmol/g or greater, yet more preferably 0.7 mmol/g or greater, especially preferably 0.8 mmol/g or greater and most preferably 0.9 mmol/g or greater. The polymerization activity may be undesirably reduced if the hydroxyl group content is below these ranges.

The mean particle size of the fine particulate carrier is not particularly restricted but will normally be in the range of 0.1–2000 $\mu$m, preferably 1–1000 $\mu$m, more preferably 10–500 $\mu$m, even more preferably 15–300 $\mu$m, yet more preferably 20–200 $\mu$m, especially preferably 25–120 $\mu$m and most preferably 30–80 $\mu$m.

The specific surface area is also not particularly restricted but will normally be in the range of 0.1–2000 m$^2$/g, preferably 10–1500 m$^2$/g, more preferably 100–1020 m$^2$/g, even more preferably 200–1000 m$^2$/g, yet more preferably 300–1000 m$^2$/g, especially preferably 400–900 m$^2$/g and most preferably 500–900 m$^2$/g.

The non-coordinating ion-containing compound (a-1) and fine particulate carrier (a-2) may be contacted by any desired method, for example, by direct contact in the absence of an organic solvent, but they will usually be contacted in the presence of an organic solvent. As organic solvents to be used there may be mentioned aliphatic hydrocarbons such as pentane and hexane, aromatic hydrocarbons such as benzene and toluene, halogenated hydrocarbons such as methylene chloride and chlorobenzene, ethers such as diethyl ether and tetrahydrofuran, amides such as N,N-dimethylformamide and N-methylpyrrolidone, alcohols such as methanol, ethanol, propanol and n-butanol, and mixtures thereof.

The contact between the non-coordinating ion-containing compound (a-1) and fine particulate carrier (a-2) may be conducted at any desired temperature in consideration of the organic solvent used and the other conditions, but it will usually be conducted in the range of –80° C. to 300° C. The range of –50° C. to 200° C. is preferred, and the range of 0–150° C. is more preferred.

There are no particular restrictions on the amount of the non-coordinating ion-containing compound (a-1) used with respect to the fine particulate carrier (a-2), but it will usually be in the range of 0.0001 to 1,000,000 parts by weight of (a-1) to 100 parts by weight of (a-2). A greater amount of (a-1) will tend to enhance the polymerization activity of the catalyst, but in consideration of balance between the polymerization activity and production cost, the amount of (a-1) used is preferably in the range of 0.1–10,000 parts by weight and more preferably in the range of 1–1000 parts by weight to 100 parts by weight of the fine particulate carrier (a-2).

Component (A) according to the invention will generally contain the non-coordinating ion-containing compound in an amount in the range of 0.010–0.50 mmol/g, preferably 0.030–0.40 mmol/g, more preferably 0.050–0.40 mmol/g, even more preferably 0.055–0.40 mmol/g, yet more preferably 0.060–0.35 mmol/g, especially preferably 0.065–0.35 mmol/g and most preferably 0.070–0.30 mmol/g, with respect to 1 gram of component (A). The polymerization activity per unit of the catalyst may be undesirably reduced if the content of the non-coordinating ion-containing compound is less than the ranges specified above, while the polymerization activity per unit of the non-coordinating ion-containing compound may be undesirably reduced if the amount is greater than these ranges.

When component (A) for the invention employs a compound with a polar group such as a hydroxyl group as (a-2), the content of the polar group such as hydroxyl, carboxyl, amino or amide in the fine particulate carrier will usually be in the range of 0.01–5.0 mmol/g, preferably 0.05–4.0 mmol/g, more preferably 0.20–4.0 mmol/g, even more preferably 0.40–4.0 mmol/g, yet more preferably 0.51–3.5 mmol/g, especially preferably 0.55–3.0 mmol/g and most preferably 0.60–2.5 mmol/g. The effect of the invention is notable when the content of polar groups of the fine particulate carrier is within the aforementioned ranges.

The content of polar groups of the fine particulate carrier in component (A) may be adjusted by heat treatment or chemical treatment of the fine particulate carrier. Specifically, component (A) may be prepared using a fine particulate carrier having the polar group content adjusted by such treatment, or component (A) may be subjected to such treatment after its preparation.

Heat treatment may be accomplished by heating the fine particulate carrier or component (A) in a temperature range of 50° C. or higher, preferably 100–1000° C. and more preferably 100–800° C., either at normal pressure or under reduced pressure.

Chemical treatment may be accomplished by contact with a compound capable of reacting with the polar group of the fine particulate carrier, and concrete examples include treatment with one or more alkylating agents, acylating agents, silylating agents, stannylating agents or germylating agents as chemical treatment agents (a-3). Specifically, the treatment may be carried out by contact with one or more alkylating agents, acylating agents, silylating agents, stannylating agents or germylating agents as chemical treatment agents (a-3), either after or simultaneously with contact between the non-coordinating ion-containing compound (a-1) and the fine particulate carrier (a-2).

As examples of alkylating agents there may be mentioned alkyl iodides or bromides such as methyl iodide, ethyl iodide, n-propyl iodide, isopropyl iodide, n-butyl iodide, n-octyl iodide, methyl bromide, ethyl bromide, n-propyl bromide and isopropyl bromide, and α-aryl substituted halogenated hydrocarbons such as benzyl chloride, benzyl bromide, benzyl iodide, diphenylmethyl chloride, diphenylmethyl bromide, diphenylmethyl iodide, triphenylmethyl chloride, triphenylmethyl bromide and triphenylmethyl iodide.

As alkylating agents there may be used alkyl sulfonates such as methyl methanesulfonate, ethyl methanesulfonate, n-propyl methanesulfonate, isopropyl methanesulfonate, n-butyl methanesulfonate, n-hexyl methanesulfonate, n-octyl methanesulfonate, methyl trifluoromethanesulfonate, ethyl trifluoromethanesulfonate, n-propyl trifluoromethanesulfonate, isopropyl trifluoromethanesulfonate, n-butyl trifluoromethanesulfonate, n-hexyl trifluoromethanesulfonate, n-octyl trifluoromethanesulfonate, methyl p-toluenesulfonate, ethyl p-toluenesulfonate, n-propyl p-toluenesulfonate and benzyl p-toluenesulfonate, oxonium salts such as trimethyloxonium tetrafluoroborate, triethyloxonium tetrafluoroborate, trimethyloxonium hexafluorophosphate, triethyloxonium hexafluorophosphate, trimethyloxonium hexafluoroantimonate and triethyloxonium hexafluoroantimonate, sulfonium salts such as trimethylsulfonium tetrafluoroborate, triethylsulfonium tetrafluoroborate and triphenylsulfonium hexafluoroantimonate, or iodonium salts such as diphenyliodonium hexafluorophosphate.

Among these are preferred alkyl iodides such as methyl iodide, ethyl iodide, n-propyl iodide, isopropyl iodide, n-butyl iodide and n-octyl iodide, α-aryl substituted halogenated hydrocarbons such as benzyl chloride, benzyl bromide, benzyl iodide, diphenylmethyl chloride, diphenylmethyl bromide, diphenylmethyl iodide, triphenylmethyl chloride, triphenylmethyl bromide and triphenylmethyl iodide, and oxonium salts such as trimethyloxonium tetrafluoroborate, triethyloxonium tetrafluoroborate, trimethyloxonium hexafluorophosphate, triethyloxonium hexafluorophosphate, trimethyloxonium hexafluoroantimonate and triethyloxonium hexafluoroantimonate.

Examples of acylating agents include carboxylic halides such as acetyl chloride, acetyl bromide, acetyl iodide propanoyl chloride, pivaloyl chloride, decanoyl chloride and benzoyl chloride, acid anhydrides such as acetic anhydride, propionic anhydride, butyric anhydride, trifluoroacetic anhydride, pivalic anhydride, benzoic anhydride and phthalic anhydride, N-acylimidazoles such as N-acetylimidazole, N-myristoylimidazole and N-palmitoylimidazole, N-acyloxyimides such as N-acetoxysuccinimide and N-acetoxyphthalimide, 4-nitrophenylacetate, 4-nitrophenylpalmitate, 4-cyanophenylacetate, and the like.

As examples of silylating agents to be used for treatment of component (A) there may be mentioned compounds represented by the following formula (3):

$$R^5_k R^6_l R^7_m SiY^1_p Y^2_q Y^3_r \qquad (3)$$

In the formula, $Y^1$, $Y^2$ and $Y^3$ are selected from among atomic groups or halogens that bind with Si atoms through O, S or N, and they may be the same or different. The letters k, l, m, p, q and r are integers of 0–3, where $1 \leq k+l+m \leq 3$, $1 \leq p+q+r \leq 3$ and $k+l+m+p+q+r=4$.

$R^5$, $R^6$ and $R^7$ are selected from among hydrogen, $C_{1-40}$ hydrocarbon groups and halogenated hydrocarbon groups, and they may be the same or different. Specific examples of hydrocarbon groups include alkyl groups, alkenyl groups, aryl groups, halogenated alkyl groups, halogenated alkenyl groups and halogenated aryl groups, such as methyl, ethyl, n-propyl, i-propyl, n-butyl, s-butyl, i-butyl, t-butyl, n-pentyl, n-hexyl, cyclopentyl, cyclohexyl, vinyl, propenyl, allyl, butenyl, phenyl, o-chlorophenyl, m-chlorophenyl, p-chlorophenyl, o-tolyl, m-tolyl, p-tolyl, α-naphthyl and β-naphthyl.

$Y^1$-$Y^3$ are selected from among atomic groups or halogens that bind with Si atoms through O, S or N atoms, and they may be the same or different. As halogens there may be used fluorine, chlorine, bromine and iodine. As atomic groups that bind with Si atoms through O atoms there may be mentioned hydroxyl, alkoxy groups such as methoxy, ethoxy, n-propoxy, i-propoxy and n-butoxy, acyloxy groups such as acetoxy and benzoyloxy, silyloxy groups such as trimethylsilyloxy, and sulfonyloxy groups such as methanesulfonyloxy, benzenesulfonyloxy, trifluoromethanesulfonyloxy and p-toluenesulfonyloxy. As atomic groups that bind with Si atoms through S atoms there may be mentioned mercapto, alkylthio and arylthio. As atomic groups that bind with Si atoms through N atoms there may be mentioned amino groups such as N,N-dimethylamino and N-trimethylsilylamino, amide groups, imide groups, imidazolyl groups, thiazolyl groups and oxazolyl groups.

Specific examples of such silylating agents include trimethylchlorosilane, triethylchlorosilane, tri-n-propylchlorosilane, tri-i-propylchlorosilane, tri-n-butylchlorosilane, tri-i-butylchlorosilane, tri-s-butylchlorosilane, t-butyldimethylchlorosilane, cyclohexyldimethylchlorosilane, dicyclohexylmethylchlorosilane, tricyclohexylchlorosilane, phenyldimethylchlorosilane, diphenylmethylchlorosilane, triphenylchlorosilane, tri-p-tolylchlorosilane, vinyldimethylchlorosilane, allyldimethylchlorosilane, n-octyldimethylchlorosilane, n-decyldimethylchlorosilane, dimethyldichlorosilane, methylethyldichlorosilane, methyl-t-butyldichlorosilane, methylvinyldichlorosilane, methyl-n-hexyldichlorosilane, methyl-n-octyldichlorosilane, di-n-hexyldichlorosilane, di-n-octyldichlorosilane, diethyldichlorosilane, diphenyldichlorosilane, methyltrichlorosilane, vinyltrichlorosilane, phenyltrichlorosilane, t-butyltrichlorosilane, and these compounds having the chlorine atoms replaced with bromine, fluorine or iodine.

Examples of alkoxy group-containing compounds include trimethylmethoxysilane, triethylmethoxysilane, tri-n-propylmethoxysilane, tri-i-propylmethoxysilane, tri-n-butylmethoxysilane, tri-i-butylmethoxysilane, tri-s-butylmethoxysilane, t-butyldimethylmethoxysilane, cyclohexyldimethylsilane, dicyclohexylmethylmethoxysilane, tricyclohexylmethoxysilane, phenyldimethylmethoxysilane, n-hexyldimethylmethoxysilane, n-octyldimethylmethoxysilane, diphenyldimethylmethoxysilane, triphenylmethoxysilane, tri-p-tolylmethoxysilane, dimethyldimethoxysilane, methylethylmethoxysilane, diethyldimethoxysilane, di-n-propyldimethoxysilane, di-i-propyldimethoxysilane, cyclohexylmethyldimethoxysilane, di-n-octyldimethoxysilane, diphenyldimethoxysilane, methyltrimethoxysilane, ethyltrimethoxysilane, n-propyltrimethoxysilane, i-propyltrimethoxysilane, n-butyltrimethoxysilane, i-butyltrimethoxysilane, s-butyltrimethoxysilane, t-butyltrimethoxysilane, cyclohexyltrimethoxysilane, phenyltrimethoxysilane and these compounds having the methoxy groups replaced with ethoxy groups.

As acyloxy group-containing compounds there may be mentioned trimethylacetoxysilane, triethylacetoxysilane, tri-n-propylacetoxysilane, tri-i-propylacetoxysilane, tri-n-butylacetoxysilane, tri-i-butylacetoxysilane, t-butyldimethylacetoxysilane, cyclohexyldimethylsilane, dicyclohexylmethylacetoxysilane, tricyclohexylacetoxysilane, phenyldimethylacetoxysilane, diphenyldimethylacetoxysilane, dimethyldiacetoxysilane, methylethylacetoxysilane, diethyldiacetoxysilane, di-n-propyldiacetoxysilane, di-i-propyldiacetoxysilane, di-n-butyldiacetoxysilane, di-i-butyldiacetoxysilane, dicyclohexyldiacetoxysilane, cyclohexylmethyldiacetoxysilane, diphenyldiacetoxysilane, methyltriacetoxysilane, ethyltriacetoxysilane, n-propyltriacetoxysilane, i-propyltriacetoxysilane, n-butyltriacetoxysilane, i-butyltriacetoxysilane, s-butyltriacetoxysilane, t-butyltriacetoxysilane, cyclohexyltriacetoxysilane, phenyltriacetoxysilane, and these compounds having the acetoxy groups replaced with other acyloxy groups such as benzoyl groups.

In addition to these, there may be mentioned trimethylphenoxysilane, phenyldimethylphenoxysilane, hexamethyldisiloxane, 1,1,3,3-tetramethyldisiloxane, trimethylsilyl methanesulfonate, trimethylsilyl trifluoromethanesulfonate and trimethylsilyl-p-toluenesulfonate.

As examples of silylating agents represented by formula (3) having atomic groups that bind with Si atoms through N atoms, there may be mentioned hexamethyldisilazane, N,N-bis(trimethylsilyl)urea, N,O-bis(trimethylsilyl)acetamide, N-trimethylsilylacetamide, N-methyl-N-trimethylsilyltrifluoroacetamide, N-trimethylsilylimidazole, N-trimethylsilylthiazole and N-trimethylsilyloxazole. These silylating agents may also be used in combination.

Preferred among these silylating agents are those wherein at least one from among $Y^1$ to $Y^3$ is a halogen, and particularly preferred are trialkylhalogenosilanes such as trimethylchlorosilane, triethylchlorosilane, tri-n-propylchlorosilane, tri-i-propylchlorosilane, tri-n-butylchlorosilane, tri-i-butylchlorosilane, tri-s-butylchlorosilane, t-butyldimethylchlorosilane, cyclohexyldimethylsilane, dicyclohexylmethylchlorosilane, tricyclohexylchlorosilane and phenyldimethylchlorosilane, as well as mixtures thereof.

As stannylating agents and germylating agents there may be mentioned compounds represented by the following formulas (4) and (5), respectively.

$$R^5_k R^6_l R^7_m SnY^1_p Y^2_q Y^3_r \qquad (4)$$

In the formula, k, l, m, p, q and r are integers of 0–3, where $1 \leq k+l+m \leq 3$, $1 \leq p+q+r \leq 3$ and k +l+m+p+q+r=4.

$$R^5_k R^6_l R^7_m GeY^1_p Y^2_q Y^3_r \qquad (5)$$

In the formula, k, l, m, p, q and r are integers of 0–3, where $1 \leq k+l+m \leq 3$, $1 \leq p+q+r \leq 3$ and k+l+m+p+q+r=4.

The definitions of $R^5$ to $R^7$ and $Y^1$ to $Y^3$ are the same as for the silylating agent described above.

As specific examples of stannylating agents there may be mentioned trimethyltin chloride, triphenyltin chloride, trimethyltin acetate, dimethyltin dichloride, dibutyltin dichloride, dimethyltin diacetate and dibutyltin diacetate. As germylating agents there may be mentioned trimethylgermanium chloride, triphenylgermanium chloride, dimethylgermanium dichloride and dibutylgermanium dichloride.

There are no particular restrictions on the amount thereof used, but it will usually be in the range of 0.01 part by weight or greater, preferably 0.1 part by weight or greater, more preferably 1.0–2000 parts by weight, even more preferably 2.0–1000 parts by weight, yet more preferably 3.0–800 parts by weight, yet more preferably 5.0–700 parts by weight, especially preferably 7.0–600 parts by weight and most preferably 10–500 parts by weight, with respect to 100 parts by weight of the fine particulate carrier (a-2).

For production of the catalyst component of the invention, components (a-1) and (a-3) may be contacted with component (a-2) either simultaneously, or in a successive manner. When (a-1) and (a-3) are contacted therewith successively, (a-1) and (a-2) may be contacted first and then contacted with (a-3), or (a-2) and (a-3) may be contacted first and then contacted with (a-1). Preferred are methods in which (a-1) and (a-2) are contacted with (a-3) simultaneously and methods in which (a-2) is contacted with (a-1), and then with (a-3), with the latter type of methods being particularly preferred.

The organic solvent, contact temperature, contact time and other conditions may differ for each stage of contact. Also, when (a-1) and (a-3) are contacted successively, either (a-1) or (a-3) may be first contacted with (a-2), and then upon removing the excess component by organic solvent washing or drying under reduced pressure, the other component may be contacted therewith. organic washing may be accomplished using the aforementioned organic solvent, or by any other desired method.

The (B) metallocene compound to be used for the invention may be any publicly known one with no particular restrictions, and examples thereof include biscyclopentadienylzirconium dichloride, bis(methylcyclopentadienyl)zirconium dichloride, bis(1,2-dimethylcyclopentadienyl)zirconium dichloride, bis(1,3-dimethylcyclopentadienyl) zirconium dichloride, bis(ethylcyclopentadienyl)zirconium dichloride, bis(n-propylcyclopentadienyl)zirconium dichloride, bis(n-butylcyclopentadienyl)zirconium dichloride, bis (1,2,3-trimethylcyclopentadienyl)zirconium dichloride, bis (1,2,4-trimethylcyclopentadienyl)zirconium dichloride, bis (pentamethylcyclopentadienyl)zirconium dichloride, (methylcyclopentadienyl)(indenyl)zirconium dichloride, (3-t-butylcyclopentadienyl)(1-indenyl)zirconium dichloride and (t-butylamide)(tetramethylcyclopentadienyl)dimethylsilanetitanium dichloride.

For production of a propylene polymer, the compound is preferably one which polymerizes propylene in a stereoregular manner such as, specifically, bis(2,3-dimethylcyclopentadienyl)dimethylsilanezirconium dichloride, bis(2,4-dimethylcyclopentadienyl)dimethylsilanezirconium dichloride, bis(2,3,5-trimethylcyclopentadienyl)dimethylsilanezirconium dichloride, (methylcyclopentadienyl) (1-indenyl)dimethylsilanezirconium dichloride and (3-t-butylcyclopentadienyl)(1-indenyl)dimethylsilanezirconium dichloride.

There may also be used (3-t-butylcyclopentadienyl)[4-t-butyl-(1-indenyl)]dimethylsilanezirconium dichloride, (methylcyclopentadienyl)(9-fluorenyl)dimethylsilanezirconium dichloride, (3-t-butylcyclopentadienyl)(9-fluorenyl)dimethylsilanezirconium dichloride, bis(1-indenyl)dimethylsilanezirconium dichloride, bis(2-methyl-1-indenyl)dimethylsilanezirconium dichloride, bis(2,4,7-trimethyl-1-indenyl) dimethylsilanezirconium dichloride, bis(2,4-dimethyl-1-indenyl)dimethylsilanezirconium dichloride, bis(2-ethyl-1-indenyl)dimethylsilanezirconium dichloride, bis(2-i-propyl-1-indenyl)dimethylsilanezirconium dichloride, and the like.

In addition, there may also be used metallocene compounds having a structure with a ring condensed onto an indenyl system as described in Japanese Unexamined Patent Publication No. 6-184179, Japanese Unexamined Patent Publication No. 6-345809 and other publications, such as bis(2-methyl-4,5-benzo-1-indenyl)dimethylsilanezirconium dichloride, bis(2-methyl-α-acenaphtho-1-indenyl)dimethylsilanezirconium dichloride, bis(2-methyl-4,5-benzo-1-indenyl)methylphenylsilanezirconium dichloride, bis(2-methyl-α-acenaphtho-1-indenyl)methylphenylsilanezirconium dichloride, 1,2-bis(2-methyl-4,5-benzo-1-indenyl)ethanezirconium dichloride and bis(4,5-benzo-1-indenyl)dimethylsilanezirconium dichloride.

There may additionally be used metallocene compounds having an aryl group at the 4-position of an indenyl system, as described in Japanese Unexamined Patent Publication No. 6-100579, Japanese Unexamined Patent Publication No. 9-176222 and other publications, such as bis(2-methyl-4-phenyl-1-indenyl)dimethylsilanezirconium dichloride, (2-methyl-4-phenyl-1-indenyl)dimethylsilanezirconium dichloride, bis[2-methyl-4-(1-naphthyl)-1-indenyl]dimethylsilanezirconium dichloride, bis[2-methyl-4-(2-naphthyl)-1-indenyl]dimethylsilanezirconium dichloride, bis[2-methyl-4-(9-anthracenyl)-1-indenyl]dimethylsilanezirconium dichloride, bis[2-methyl-4-(9-phenanthryl)-1-indenyl]dimethylsilanezirconium dichloride, bis[2-methyl-4-(3,5-di-i-propylphenyl)-6-i-propyl-1-indenyl]dimethylsilanezirconium dichloride and bis(2-methyl-4-phenyl-6-i-propyl-1-indenyl)dimethylsilanezirconium dichloride.

There may still additionally be used metallocene compounds having an azulene system, as described in Japanese Unexamined Patent Publication No. 10-226712, Japanese Unexamined Patent Publication No. 10-279588 and other publications, such as bis(2-methyl-4-phenyl-4-hydro-1-azulenyl)dimethylsilanezirconium dichloride, bis(2-ethyl-4-phenyl-4-hydro-1azulenyl)dimethylsilanezirconium dichloride, bis[2-methyl-4-(chlorophenyl)-4-hydro-1-azulenyl] dimethylsilanezirconium dichloride, bis[2-methyl-4-(fluorophenyl)-4-hydro-1-azulenyl] dimethylsilanezirconium dichloride and bis(2-methyl-4-phenyl-4-hydro-1-azulenyl)(chloromethyl) methylsilanezirconium dichloride.

There may also be used bis[2-methyl-($\eta^5$-1-indenyl)] methylphenylsilanezirconium dichloride, 1,2-bis($\eta^5$-1-indenyl)ethanezirconium dichloride, 1,2-bis[2-methyl-($\eta^5$-1-indenyl)]ethanezirconium dichloride, 1,2-bis[2,4-dimethyl-($\eta^5$-1-indenyl)]ethanezirconium dichloride, 1,2-bis[2,4,7-trimethyl-($\eta^5$-1-indenyl)]ethanezirconium dichloride, 1,2-bis[2-ethyl-($\eta^5$-1-indenyl)]ethanezirconium dichloride, 1,2-bis[2-n-propyl-($\eta^5$-1-indenyl)]ethanezirconium dichloride, [2-ethyl-($\eta^5$-1-indenyl)ethanezirconium dichloride, [2-methyl-($\eta^5$-1-indenyl)]ethanezirconium dichloride, 1,2-bis($\eta^5$-9-fluorenyl)ethanezirconium dichloride, 2-(3-t-butylcyclopentadienyl)-2-($\eta^5$-1-indenyl)propanezirconium dichloride, 2-(3-t-butylcyclopentadienyl)-2-[4-t-butyl-($\eta^5$-1-indenyl)] propanezirconium dichloride, 2-(3-methylcyclopentadienyl)-2-($\eta^5$-9-fluorenyl)propanezirconium dichloride and 2-(3-t-butylcyclopentadienyl)-2-($\eta^5$-9-fluorenyl)propanezirconium dichloride.

Among these compounds there are preferred metallocene compounds having an aryl group at the 4-position of an indenyl system, as described in Japanese Unexamined Patent Publication No. 6-100579, Japanese Unexamined Patent Publication No. 9-176222, etc., metallocene compounds having a structure with a ring condensed onto an indenyl system as described in Japanese Unexamined Patent Publication No. 6-184179, Japanese Unexamined Patent Publication No. 6-345809, etc. and metallocene compounds having an azulene system, as described in Japanese Unexamined Patent Publication No. 10-226712, Japanese Unexamined Patent Publication No. 10-279588, etc., with bis[2-methyl-4,5-benzo($\eta^5$-1-indenyl)]dimethylsilanezirconium dichloride, bis[2-methyl-4-phenyl-($\eta^5$-1-indenyl)]dimethylsilanezirconium dichloride, bis[2-methyl-4-(1-naphthyl)-($\eta^5$-1-indenyl)]dimethylsilanezirconium dichloride and bis (2-methyl-4-phenyl-4-hydro-1-azulenyl) dimethylsilanezirconium dichloride being particularly preferred.

There may also be used, with no particular restrictions, these metallocene compounds having the zirconium replaced with other metals such as titanium or hafnium, or having the chlorine atoms replaced with other halogens or with hydrogen atoms, amide groups, alkoxy groups or hydrocarbon groups such as methyl or benzyl. Preferred among these for component (B) are those having one or more halogens, alkoxides, aryl oxides or amides, more preferably having one or more halogens, and most preferably having one or more chlorine atoms, bonded as a ligand to the transition metal, such as zirconium.

The amount of component (B) used with respect to component (A) is such that the non-coordinating ion-containing compound in component (A) is in the range of preferably 0.05–100 moles, more preferably 0.1–50 moles, even more preferably 0.3–20 moles, and most preferably 0.5–10 moles, with respect to 1 mole of the transition metal, such as zirconium, in component (B).

The (C) organometallic compound is selected from among organic aluminum compounds, organic lithium compounds, organic zinc compounds and organic magnesium compounds, any of which may also be used in combination. Organic aluminum compounds are preferably used.

Any known organic aluminum compound may be used, and as examples there may be mentioned trialkylaluminum compounds such as trimethylaluminum, triethylaluminum, tri-n-propylaluminum and tri-i-butylaluminum, dialkylaluminum halides and alkylaluminum dihalides such as dimethylaluminum chloride, diethylaluminum chloride, methylaluminum dichloride, ethylaluminum dichloride and monoisobutylaluminum dichloride, dialkylaluminum hydrides such as diisobutylaluminum hydride, dialkylaluminum alkoxides or aryloxides such as diethylaluminum methoxide and diethylaluminum phenoxide, and alkenylaluminum compounds such as triisoprenylaluminum. Olefin polymers can be produced by especially high polymerization activity, according to the invention, even when using triethylaluminum.

Among these are preferred trialkylaluminum, with $C_{1-10}$ alkyl groups being especially preferred. Specifically these include triethylaluminum, tri-n-propylaluminum, tri-i-propylaluminum, tri-n-butylaluminum, tri-i-butylaluminum, tri-n-hexylaluminum, tri-n-octylaluminum, tri-n-decylaluminum, tri-i-hexylaluminum and tri-i-octylaluminum, among which tri-n-propylaluminum, tri-n-butylaluminum, tri-n-hexylaluminum, tri-n-octylaluminum, tri-n-decylaluminum, tri-i-hexylaluminum and tri-i-octylaluminum are especially preferred, and tri-n-hexylaluminum and tri-n-octylaluminum are most preferred. These may be used alone or in various combinations as necessary.

As organic lithium compounds there may be mentioned aryllithium compounds such as phenyllithium, or alkyllithium compounds such as methyllithium, n-butyllithium, i-butyllithium, s-butyllithium and t-butyllithium organic zinc compounds include dimethylzinc, diethylzinc and the like, and organic magnesium compounds include dialkylmagnesium compounds such as di-n-butylmagnesium, di-n-hexylmagnesium, n-butylethylmagnesium, methylmagnesium bromide, ethylmagnesium bromide and n-propylmagnesium bromide, as well as i-propylmagnesium bromide, n-butylmagnesium chloride, i-butylmagnesium chloride, s-butylmagnesium chloride, t-butylmagnesium chloride, phenylmagnesium bromide, and such alkylmagnesium halide compounds having the chlorine or bromine atoms replaced with other halogens.

The amount of component (C) used for the invention is not particularly restricted, but it will generally be in the range of 10–100,000 moles, and usually in the range of 20–70,000 moles, preferably 25–50,000 moles, more preferably 50–30,000 moles, even more preferably 70–30,000 moles, yet more preferably 100–30,000 moles, especially preferably 150–20,000 moles and most preferably 200–10,000 moles, with respect to 1 mole of the transition metal such as zirconium in component (B).

Component (D) according to the invention is at least one selected from among (I) liquid hydrocarbons with a kinematic viscosity of 5.0 mm$^2$/s or greater at 30° C., (II) solid hydrocarbons other than crystalline olefin polymers, and (III) crystalline olefin polymers. Any of these compounds may be used alone, or more than one of them may be used in admixture. The total carbon and hydrogen content in such compounds is 70 wt % or greater, preferably 80 wt % or greater, more preferably 90 wt % or greater and most preferably 95 wt % or greater.

The object of the invention is difficult to achieve unless the aforementioned compounds are used as component (D) for the invention. That is, the polymerization activity may be undesirably reduced during storage after preparation of the catalyst component, or when the stored catalyst component or catalyst is used for polymerization, the solvent-soluble components in the resulting polymer may be increased, and the molecular weight distribution may be wider. In addition, using the stored catalyst for polymerization may result in problems such as fouling, production of polymer particles with low bulk density, or formation of bulk polymers by cohesion between the particles.

The kinematic viscosity of a (I) liquid hydrocarbon used as component (D) is preferably 10.0 mm$^2$/s or greater, more preferably 15.0 mm$^2$/s or greater, even more preferably 20.0 mm$^2$/s or greater, yet more preferably 25.0 mm$^2$/s or greater, especially preferably 30.0 mm$^2$/s or greater and most preferably 35.0 mm$^2$/s or greater. The kinematic viscosity may be measured according to the method of JIS K2283.

The weight-average molecular weight will usually be in the range of 200–100,000, preferably in the range of 200–80,000, more preferably in the range of 200–50,000, even more preferably in the range of 240–30,000, especially preferably in the range of 270–20,000 and most preferably in the range of 300–10,000.

Specific examples of liquid hydrocarbons with a kinematic viscosity of 5.0 mm$^2$/s or greater at 30° C. include liquid paraffin, processed oils, liquid polybutadiene, liquid hydrogenated polybutadiene, liquid polyisobutylene, liquid polystyrene, petroleum resins, liquid atactic polypropylene and the like, and any commercially available product may be used.

The (II) solid hydrocarbons other than crystalline olefin polymers to be used as component (D) are one or more selected from among semi-solid, glassy or elastomeric hydrocarbons with no melting point, and crystalline hydrocarbons other than crystalline olefin polymers.

Preferred are crystalline hydrocarbons, i.e. compounds having a melting point. The melting point of such a solid hydrocarbon is preferably no higher than 150° C., more preferably in the range of 30–130° C., even more preferably in the range of 35–100° C., yet more preferably in the range of 35–90° C., especially preferably in the range of 40–90° C. and most preferably in the range of 40–80° C.

The weight-average molecular weight of a solid hydrocarbon other than a crystalline olefin polymer for (II) to be used as component (D) will usually be in the range of 250–100,000, and is preferably in the range of 250–50,000, more preferably in the range of 250–30,000, even more preferably in the range of 270–20,000, especially preferably in the range of 300–15,000 and most preferably in the range of 300–10,000.

Specific examples of the (II) solid hydrocarbons other than crystalline olefin polymers include yellow vaseline, white vaseline, petrolatum, petroleum waxes such as microcrystalline wax and paraffin wax, polystyrene, polyisobutylene, hydrogenated polybutadiene, ethylene/propylene copolymer elastomer, and the like.

When the hydrocarbon used as component (D) is a (III) crystalline olefin polymer, it is one or more crystalline polymers selected from among olefins including linear olefins such as ethylene, propylene, 1-butene, 1-pentene, 1-hexene, 1-octene and 1-decene, branched olefins such as 3-methyl-1-butene and 4-methyl-1-pentene, or cyclic olefins such as vinylcyclopentane, vinylcyclohexane and vinylcyclohexene.

Compound (III) is preferably a (III-1) one wherein at least one olefin is prepolymerized by the olefin polymerization catalyst composed of (A), (B) and (C).

There are no particular restrictions on the olefins used here, which may be linear olefins such as ethylene, propylene, 1-butene, 1-pentene, 1-hexene, 1-octene or 1-decene, branched olefins such as 3-methyl-1-butene or 4-methyl-1-pentene, or cyclic olefins such as vinylcyclopentane, vinylcyclohexane or vinylcyclohexene. Preferred among these are linear olefins such as ethylene, propylene and 1-butene and cyclic olefins such as vinylcyclohexane, and propylene is especially preferred as the major component.

The weight-average molecular weight of (III-1) will usually be in the range of 5000–3,000,000, preferably in the range of 10,000–2,500,000, more preferably in the range of 20,000–2,000,000, even more preferably in the range of 30,000–1,500,000, especially preferably in the range of 50,000–1,500,000 and most preferably in the range of 100,000–1,500,000. The melting point of (III-1) as measured with a differential scanning calorimeter will usually be 250° C. or below, preferably 200° C. or below, more preferably 160° C. or below and most preferably 150° C. or below.

Specific examples of (III-1) include polyethylene, polypropylene, polybutene and poly(4-methyl-1-pentene), among which polyethylene and polypropylene are preferred, and polypropylene is most preferred. In the case of polypropylene, the melting point will generally be 152.5° C. or below, usually 130–152.0° C., preferably 130.0–151.5° C., more preferably 135.0–151.0° C., even more preferably 138.0–150.5° C., yet more preferably 140.0–150.0° C., especially preferably 140.0–149.5° C. and most preferably 140.0–149.0° C. When (III-1) is polypropylene or polyethylene, the weight-average molecular weight is preferably in the range of 10,000–1,500,000, more preferably in the range of 20,000–1,000,000, even more preferably in the range of 20,000–500,000, especially preferably in the range of 50,000–400,000 and most preferably in the range of 100,000–300,000.

Another preferred embodiment of (III) is (III-2) polyolefin waxes, which are crystalline waxes obtained by polymerization of the aforementioned olefins or thermal decomposition of olefin polymers. More specifically, these include polyethylene wax, polypropylene wax, ethylene-vinyl acetate copolymer wax, and the like. Their melting points are usually in the range of 40–200° C., and in the case of polyethylene wax or ethylene-vinyl acetate copolymer wax, the melting point is preferably in the range of 50–140° C., more preferably in the range of 60–120° C. and most preferably in the range of 70–110° C. In the case of polypropylene wax, it is preferably in the range of 120–170° C., more preferably in the range of 130–165° C. and most preferably in the range of 140–160° C. The weight-average molecular weight will usually be in the range of 300–20,000, preferably in the range of 500–10,000 and more preferably in the range of 1000–8000.

The amount of component (D) used with respect to component (A) will usually be in the range of 1–1,000,000 parts by weight to 100 parts by weight as the total of (A) and (B). When (I), (II) or (III-2) is used as component (D), it is used in a range of preferably 5–8000 parts by weight, more preferably 10–6000 parts by weight, even more preferably 20–5000 parts by weight, yet more preferably 25–5000 parts by weight, especially preferably 30–4000 parts by weight and most preferably 40–3000 parts by weight to 100 parts by weight of the total of (A) and (B). When (III-1) is used as component (D), it is used in a range of preferably 1–200,000 parts by weight and more preferably 5–100,000 parts by weight to 100 parts by weight of the total of (A) and (B).

For production of an olefin homopolymer using the olefin polymerization catalyst of the invention, (III-1) is used in the range of 5–5000 parts by weight, preferably 10–3000 parts by weight, more preferably 20–2000 parts by weight, even more preferably 40–1500 parts by weight, yet more preferably 60–1200 parts by weight, especially preferably 80–1000 parts by weight and most preferably 100–1000 parts by weight to 100 parts by weight of the total of (A) and (B).

For production of an olefin copolymer using the olefin polymerization catalyst of the invention, (III-1) is used in the range of 5–50,000 parts by weight, preferably 10–30,000 parts by weight, more preferably 20–20,000 parts by weight, even more preferably 40–15,000 parts by weight, yet more preferably 60–10,000 parts by weight, especially preferably 80–8000 parts by weight and most preferably 100–5000 parts by weight to 100 parts by weight of the total of (A) and (B). If these (D) compounds are used in ranges outside of those specified above, the resulting olefin polymer may have increased solvent-soluble components or a wider molecular weight distribution.

The olefin polymerization catalyst of the invention comprises (A), (B), (C) and (D) described above. There are no particular restrictions on the method of preparation, and examples thereof include a method of preparation by contacting the components in some desired manner (Method 1), a method of producing (D) by prepolymerization of an olefin using an olefin polymerization catalyst comprising (A), (B) and (C) (Method 2) and a method which combines these methods (Method 3). When (I), (II) or (III-2) is used as component (D), it may be prepared by Method 1, and when (III-1) is used as component (D), it may be prepared by Method 2. When (I), (II) or (III-2) and (III-1) are used together as component (D), it may be prepared by Method 3.

When the olefin polymerization catalyst of the invention is prepared by Method 1, the components may be contacted in any desired order, by a method in which the catalyst components (A), (B), (C) and (D) are contacted simultaneously, a method in which three of the catalyst components are contacted first and then the remaining component is contacted therewith, a method in which two of the catalyst components are contacted and then the other two components are simultaneously contacted therewith, or a method in which two of the catalyst components are contacted first and then the other two components are successively contacted therewith. The components may be contacted any desired number of times, and each component may also be contacted a plurality of times.

The contact with each component may be carried out in the presence of any desired solvent, or in the absence of a solvent, and if a solvent is used it may be an aliphatic hydrocarbon such as propane, butane, pentane, hexane, heptane, octane, decane or the like, an alicyclic hydrocarbon such as cyclopentane, cyclohexane, methylcyclohexane or the like, an aromatic hydrocarbon such as benzene, toluene, xylene, ethylbenzene or the like, a halogenated hydrocarbon such as dichloromethane, chloroform, carbon tetrachloride, 1,2-dichloroethane, chlorobenzene, dichlorobenzene or the like, or an ether such as diethyl ether, dibutyl ether, diphenyl ether, tetrahydrofuran, 1,2-dimethoxyethane or the like. Preferred among these are aromatic hydrocarbons and halogenated hydrocarbons, with toluene, xylene, dichloromethane and chloroform being preferred. The hydrocarbon solvent used may also be a combination of more than one solvent. When the components are contacted successively, different solvents may be used at each stage of contact.

The contacting temperature will differ depending on the combination of components to be contacted, but will usually be in the range of −70 to 200° C., preferably in the range of −50 to 150° C. and most preferably in the range of −20 to 120° C. The contacting time may be as desired, and will usually be in the range of 0.5–600 minutes, preferably 1–300 minutes and more preferably 3–120 minutes. When the components are contacted successively, the temperature and time for contact may differ for each stage of contact.

Preferred among these methods are (1) a method in which (A), (B) and (C) are contacted either simultaneously or successively and then (D) is contacted therewith, (2) a method in which (A), (B) and (D) are contacted either simultaneously or successively and then (C) is contacted therewith, and (3) a method in which (A) and (B) are contacted, with (D) if necessary, and then (C) and (D) are contacted therewith.

A more specific method according to (1) is a method of preparing an olefin polymerization catalyst in which (A), (B) and (C) are contacted in a solvent such as hexane, toluene, xylene, chlorobenzene or dichloromethane in a temperature range of −20° C. to 80° C., and then (D) is contacted therewith either in the presence of the solvent or in the absence of the solvent after it has been removed, in a temperature range of 0° C. to 120° C. The catalyst exhibits no notable reduction in polymerization activity and is able to produce olefin polymers with a low solvent-soluble components content even after storage.

A more specific method according to (2) may be the following. Specifically, (A) and (B) are contacted in a solvent in which (B) is highly soluble, such as toluene, xylene, chlorobenzene, dichloromethane or tetrahydrofuran, in a temperature range of −20° C. to 120° C., the solvent is removed, and then (D) is contacted therewith in the absence of the solvent in a temperature range of 0° C. to 120° C., to prepare an olefin polymerization catalyst component. Next, the catalyst component may be contacted with (C) in a temperature range of 0° C. to 80° C., to obtain an olefin polymerization catalyst. The contact with (C) may be carried out either outside or inside the polymerization reactor. The catalyst exhibits no notable reduction in polymerization activity and is able to produce olefin polymers with a low solvent-soluble components content even when the catalyst components are stored before contact with (C) to prepare the polymerization catalyst.

A more specific method according to (3) is a method in which (A) and (B) are contacted in a solvent in which (B) is highly soluble, such as toluene, xylene, chlorobenzene, dichloromethane or tetrahydrofuran, and are then contacted with (C) and (D) which have been contacted in a hydrocarbon solvent such as hexane, cyclohexane, toluene or xylene, or in the absence of a solvent, to prepare an olefin polymerization catalyst. Alternatively, the contact between (A) and (B) may be followed by removal of the solvent used for the contact and then contact with (C) and (D) which have been contacted in the absence of a solvent. The contact between (A) and (B) may also be carried out in the presence of (D).

Any catalyst comprising (A), (B) and (C) may be used for production of the olefin polymerization catalyst of the invention by Method 2. There are no particular restrictions on the method of producing the catalyst, and the different components used may also be as desired.

The method of prepolymerization for Method 2 is not particularly restricted, and any publicly known method may be employed. Specifically, it may be accomplished by contact with a liquid or gaseous olefin in a non-polymerizable medium, or in the absence of such a medium, but it is preferably accomplished in a non-polymerizable medium in order to control the amount of production of the prepolymer. As non-polymerizable media there may be mentioned aliphatic hydrocarbons such as propane, butane, pentane, hexane, heptane, octane, decane, light oil and kerosene, alicyclic hydrocarbons such as cyclohexane and methylcyclohexane, and aromatic hydrocarbons such as toluene and xylene. Preferred among these are aliphatic hydrocarbons and alicyclic hydrocarbons. The content of such a non-polymerizable medium in the prepolymerization reaction system will usually be 10 wt % or greater, preferably 20 wt % or greater, more preferably 30 wt % or greater, even more preferably 40 wt % or greater, yet more preferably 50 wt % or greater, especially preferably 60 wt % or greater and most preferably 70 wt % or greater.

There are no particular restrictions on the temperature for prepolymerization, but it will usually be in the range of −80 to 150° C., preferably −50 to 100° C., more preferably −20 to 80° C., even more preferably −10 to 60° C. and most preferably −5 to 50° C. The prepolymer may be used directly for polymerization, or it may be used after passing through steps such as washing and drying. The prepolymerization degree of the olefin may be adjusted by changing the polymerization temperature, polymerization time, olefin supply volume, etc. to within the aforementioned ranges for use of the compound (III-1).

When an olefin polymerization catalyst of the invention is prepared by Method 3, there are no restrictions on the order of carrying out Method 1 and Method 2. That is, a catalyst containing one or more of (I), (II) and (III-2) may be prepared by Method 1 and used for prepolymerization of an olefin to produce (III-1), or a catalyst containing (III-1) may be prepared by Method 2 and contacted with one or more of (I), (II) and (III-2). Methods 1 and 2 employed for Method 3 may be carried out in the same manner as when they are carried out alone. There are no particular restrictions on the prepolymerization conducted for Method 3, and the conditions for prepolymerization and degree of prepolymerization may be as desired, but they are preferably in the ranges specified above for Method 2.

The olefin polymerization catalyst components of the invention will now be explained. The olefin polymerization catalyst components according to the invention are (A), (B) and (D) as mentioned above. The catalyst components contain no spontaneously igniting substances and are easy to handle. Component (B) preferably has a halogen, alkoxide, aryl oxide, amide or diene as the ligand bound to the transition metal, with halogens being preferred and chlorine being most preferred.

There are no particular restrictions on the method of preparing the olefin polymerization catalyst components of the invention, and the components may be contacted by any desired method. The order of contact may also be as desired, with the catalyst components (A), (B) and (D) being contacted simultaneously, or two of the catalyst components being contacted first and then contacted with the remaining component. The components may be contacted any desired number of times, and each component may also be contacted a plurality of times.

The contact with each component may be carried out in the presence of any desired solvent, or in the absence of a solvent, and if used, the solvent may be the same used for preparation of the olefin polymerization catalyst of the invention. Preferred are aromatic hydrocarbons and halogenated hydrocarbons, with toluene, xylene, dichloromethane and chloroform being preferred. The hydrocarbon solvent used may also be a combination of more than one solvent. When the components are contacted successively, different solvents may be used at each stage of contact.

The contacting temperature will differ depending on the combination of components to be contacted, but will usually be in the range of −70 to 200° C., preferably in the range of −50 to 150° C. and most preferably in the range of −20 to 120° C. The contacting time may be as desired, and will usually be in the range of 0.5–600 minutes, preferably 1–300 minutes and more preferably 3–120 minutes. When the components are contacted successively, the temperature and time for contact may differ for each stage of contact.

Preferred among these methods are (1) a method in which (A), (B) and (D) are contacted simultaneously, (2) a method in which (A) and (B) are contacted and then (D) is contacted therewith, with the latter method being particularly preferred.

It is another object of the invention to provide a method for storage of the olefin polymerization catalyst. Specifically, it is characterized in that an olefin polymerization catalyst comprising components (A), (B) and (C) is stored in (D) a hydrocarbon, wherein the (D) hydrocarbon is a specified one.

The "storage" referred to here includes all of the steps and conditions from immediately after preparation of the olefin polymerization catalyst to initial use thereof for olefin polymerization, where these steps and conditions are maintained for fixed time periods. More specifically, such steps and conditions include (1) temporary storage in a preparation apparatus or storage apparatus immediately after preparation of the olefin polymerization catalyst, up to its use for polymerization, (2) filling from the preparation apparatus into a catalyst transport container, (3) transport from the preparation apparatus to a storage facility using the catalyst transport container, (4) transport from the storage facility to a polymerization facility using the catalyst transport container, (5) transport from the preparation apparatus to a polymerization facility using the catalyst transport container, and (6) filling from the catalyst transport container into a storage facility or polymerization facility.

The apparatus used for storage is not particularly restricted, and storage will normally be carried out in the dark in an atmosphere of an inert gas such as nitrogen, argon, helium or the like. The storage temperature is also not particularly restricted, and will normally be in the range of −50° C. to 100° C., preferably in the range of −30° C. to 70° C. and more preferably in the range of −10° C. to 50° C. For storage at the prescribed temperature, the method may be storage in a container or facility equipped with a temperature-control device, or the method may involve keeping the container or facility filled with the catalyst at a prescribed temperature in a thermostatic chamber.

The storage time, i.e. the time that the steps or conditions are maintained, may be as desired, but the storage time will be usually one minute or longer, more usually 10 minutes or longer, still more usually 1 hour or longer, even more usually 5 hours or longer, yet more usually 10 hours or longer and most usually 1–1000 days. The storage time will preferably be 1–300 days, more preferably 1–200 days, especially preferably 1–150 days and most preferably 1–100 days.

The components (A), (B), (C) and (D) used for the storage method of the invention are the same as those described for the olefin polymerization catalyst of the invention, and their preferred modes are also the same as mentioned for the olefin polymerization catalyst of the invention. The amounts thereof used and the conditions for their preparation are also the same as described for the olefin polymerization catalyst of the invention.

The storage may be accomplished also using a compound other than (D) of the invention, for example, an aliphatic hydrocarbon such as pentane, hexane, heptane, octane, decane or the like, an alicyclic hydrocarbon such as cyclohexane, methylcyclohexane or the like, or an aromatic hydrocarbon such as toluene, xylene or the like, for storage in a slurry state using the compound other than (D) as the solvent. The storage may also be after washing with the solvent, after removal of the solvent or after drying.

The method for storage of the olefin polymerization catalyst components of the invention may be carried out in the same manner as the method for storage of the olefin polymerization catalyst. Specifically, it is characterized in that an olefin polymerization catalyst component comprising components (A) and (B) is stored in (D) a hydrocarbon, wherein the (D) hydrocarbon is a specified one. The "storage" referred to here includes all of the steps and conditions from immediately after preparation of the catalyst components to initial preparation of the olefin polymerization catalyst, where these steps and conditions are maintained for fixed time periods. More specifically, these include (1) temporary storage in a preparation apparatus or storage apparatus immediately after preparation of the catalyst components, up to their use for preparation of the polymerization catalyst, (2) filling from the preparation apparatus into a transport container, (3) transport from the preparation apparatus to a storage facility using the transport container, (4) transport from the storage facility to a polymerization catalyst preparation facility or polymerization facility using the transport container, (5) transport from the preparation apparatus to a polymerization catalyst preparation facility or polymerization facility using the transport container, and (6) filling from the transport container into a polymerization catalyst preparation facility or polymerization facility.

The apparatus used for storage of the olefin polymerization catalyst components is not particularly restricted, and storage will normally be carried out in the dark in an atmosphere of an inert gas such as nitrogen, argon, helium or the like. The storage temperature is also not particularly restricted, and will normally be in the range of −50° C. to 100° C., preferably in the range of −30° C. to 70° C. and more preferably in the range of −10° C. to 50° C. For storage at the prescribed temperature, the method may be storage in a container or facility equipped with a temperature-control device, or the method may involve keeping the container or facility filled with the catalyst at a prescribed temperature in a thermostatic chamber.

The storage time, i.e. the time that the steps or conditions are maintained, may be as desired, but the storage time will be usually one minute or longer, more usually 10 minutes or longer, still more usually 1 hour or longer, even more usually 5 hours or longer, yet more usually 10 hours or longer and most usually 1–1000 days. The storage time will preferably be 1–300 days, more preferably 1–200 days, especially preferably 1–150 days and most preferably 1–100 days.

The components (A), (B) and (D) used for the storage method of the invention are the same as those described for the olefin polymerization catalyst of the invention, and their preferred modes are also the same as mentioned for the olefin polymerization catalyst of the invention. The amounts thereof used and the conditions for their preparation are also the same as described for the olefin polymerization catalyst of the invention.

The storage may be accomplished also using a compound other than (D) of the invention, for example, an aliphatic hydrocarbon such as pentane, hexane, heptane, octane, decane or the like, an alicyclic hydrocarbon such as cyclohexane, methylcyclohexane or the like, or an aromatic hydrocarbon such as toluene, xylene or the like, for storage in a slurry state using the compound other than (D) as the solvent. The storage may also be after washing with the solvent, after removal of the solvent or after drying.

The olefin polymerization catalyst of the invention may be used for production of any manner of olefin polymer. Specifically, it may be used for production of polymers such as ethylene, propylene, 1-butene, 1-pentene, 1-hexene, 1-octene, 3-methyl-1-butene, 4-methyl-1-pentene, 1-decene, vinylcyclohexane, etc. and their copolymers, and for production by copolymerization with small amounts of vinyl aromatic compounds such as styrene and vinyltoluene or conjugated or non-conjugated dienes such as butadiene, isoprene, chloroprene and 1,4-hexadiene.

The olefin polymerization catalyst of the invention may be employed in any desired polymerization process. Specifically there may be mentioned bulk polymerization conducted in a liquid olefin, solution polymerization or slurry polymerization conducted in a liquid phase in the presence of an inert solvent, and gas phase polymerization conducted in a gas phase monomer. Bulk polymerization and gas phase polymerization are preferred, with bulk polymerization being particularly preferred.

The polymerization temperature may be selected as desired in consideration of productivity and the molecular weight of the olefin polymer to be produced, but it will usually be in the range of 0° C. to 130° C., preferably in the range of 20° C. to 120° C., more preferably in the range of 40° C. to 100° C., especially preferably in the range of 56° C. to 95° C. and most preferably in the range of 60° C. to 90° C. The pressure will generally be from ordinary pressure to 7.0 MPa for polymerization in a liquid phase and from ordinary pressure to 5.0 MPa for polymerization in a gas phase, and the range may be appropriately selected in consideration of the properties of the olefin polymer to be obtained, and productivity. The molecular weight may be adjusted during the polymerization by any desired means such as hydrogen introduction or selection of temperature and pressure.

The olefin polymerization catalyst of the invention is particularly suitable for production of propylene polymer, and especially propylene copolymers, and the catalyst, even after having been stored by the aforementioned storage method, exhibits high polymerization activity and can produce polymers with low solvent-soluble components while avoiding a wider molecular weight distribution, even for production of propylene copolymers.

The catalyst of the invention may also be used for additional prepolymerization. There are no particular restrictions on such additional prepolymerization, but preferably the olefin and the catalyst are supplied continuously or intermittently to a prepolymerization reactor, to accomplish continuous prepolymerization. The additional prepolymerization is preferably carried out by bulk polymerization, and the content of the non-polymerizable medium in the reaction system is preferably no greater than 90 wt %, more preferably no greater than 85 wt %, even more preferably no greater than 80 wt %, yet more preferably no greater than 70 wt %, especially preferably no greater than 60 wt % and most preferably no greater than 50 wt %. The catalyst used for the additional prepolymerization is preferably supplied to the reactor for polymerization of the olefin without being isolated.

The temperature for the additional prepolymerization is not particularly restricted but will usually be in the range of −20° C. to 80° C., preferably −10° C. to 70° C., more preferably −10° C. to 50° C., even more preferably 0° C. to 40° C. and yet more preferably 0° C. to 30° C.

The additional prepolymerization is conducted such that the olefin is polymerized in a range of 100–500,000 parts by weight, preferably 200–200,000 parts by weight, more preferably 500–100,000 parts by weight, even more preferably 1000–50,000 parts by weight, yet more preferably 1500–30,000 parts by weight, especially preferably 2000–20,000 parts by weight and most preferably 2500–20,000 parts by weight, with respect to 100 parts by weight as the total of (A) and (B). The degree of prepolymerization, polymerization temperature, polymerization time, olefin supply volume, etc. may be varied for adjustment to within the above ranges.

According to the invention, the weight-average molecular weight of the resulting propylene polymer will usually be 50,000 or greater, preferably 100,000 or greater, more preferably in the range of 110,000–2,000,000, even more preferably in the range of 120,000–1,500,000 and most preferably in the range of 130,000–1,000,000. Production of a propylene polymer having a weight-average molecular weight of less than 50,000 may result in problems such as increased solvent-soluble components and a wider molecular weight distribution.

A propylene polymer produced according to the invention will generally have a melting point Tm and propylene content Fp satisfying the relationship of inequality (6) below, preferably inequality (7) below and more preferably inequality (8) below.

$$140 < Tm + 5.5(100 - Fp) < 165 \qquad (6)$$

$$145 < Tm + 5.5(100 - Fp) < 160 \qquad (7)$$

$$147 < Tm + 5.5(100 - Fp) < 157 \qquad (8)$$

Production of a propylene polymer which does not satisfy inequality (6) may result in problems such as increased solvent-soluble components and a wider molecular weight distribution.

The present invention will now be explained in greater detail through examples, with the understanding that the invention is in no way limited thereby.

Measurement of hydroxyl group content of component (A)

After sampling a prescribed amount of component (A), it was reacted with an excess of methyllithium in hexane, and the volume of methane gas generated was measured. When methane gas was also generated from the non-coordinating ion-containing compound, the generated volume was estimated from the boron content of component (A) and subtracted to obtain the hydroxyl group content.

Measurement of xylene-soluble portion Xs Approximately 2 g of the olefin polymer was precisely weighed out (indicated as W(g)) and dissolved in 250 ml of boiling xylene under a nitrogen stream. Next, the solution was cooled to 25° C. and allowed to stand for 30 minutes, and the produced precipitate was rapidly filtered. A 100 ml portion of the filtrate was sampled and placed in an aluminum vessel with a determined constant weight, and heated under a nitrogen stream to evaporate off the xylene. The weight of the evaporation residue was determined (indicated as m(g)), and the xylene-soluble portion Xs of the olefin polymer was calculated from equation (9) below.

$$Xs\ (wt\%) = m \times 250/W \qquad (9)$$

Measurement of Melt Flow Rate

This was measured according to JIS K7210, at 230° C. with a load of 2.16 kg.

Measurement of Melting Point Tm

A DCS7 differential scanning calorimeter manufactured by PERKIN-ELMER was used. After first raising the temperature to 230° C. and holding it for 5 minutes, it was cooled to −30° C. at 20° C./min and then held for 5 minutes. The melting peak exhibited when temperature was then again raised at 20° C./min was recorded as the melting point.

Measurement of Weight-average Molecular Weight/Number-average Molecular Weight Ratio (Mw/Mn)

1) Creation of Calibration Curve

To 10 ml of 1,2,4-trichlorobenzene containing 0.1 wt % of BHT (2,6-di-t-butyl-4-methylphenol) there was added 2 mg each of three different standard polystyrene samples with different molecular weights (products of Showa Denko, KK.), and after dissolution for 1 hour in the dark at room temperature, the peak top elution time was measured by GPC. The measurement was repeated, and a calibration curve was created by third order approximation from the elution times of a total of 12 molecular weights (molecular weight 580 to 8,500,000) and peak tops.

2) Measurement of Weight-average Molecular Weight (Mw) and Number-average Molecular Weight (Mn)

A 5 ml portion of 1,2,4-trichlorobenzene containing 0.1 wt % BHT was poured into a test tube, and approximately 2.5 mg of polypropylene (sample) was added. After stoppering the test tube, the sample was dissolved over a 2 hour period in a thermostatic chamber at 160° C. The resulting solution was filtered with a sintered filter and the filtrate was measured using a 150C Gel Permeation Chromatography Apparatus from Waters Co., after which the Mw and Mn were determined from the chromatogram and the molecular weight ratio (Mw/Mn) was calculated. The other GPC measurement conditions were as follows.

Detector: Differential refractometer
Column: Shodex HT-G (1 column) by Showa Denko, KK. and Shodex HT-806M (2 columns) by Showa Denko, KK., serially connected.
Column temperature: 140° C.
Solvent: 1,2,4-trichlorobenzene (containing 0.1 wt % BHT)
Sample introduction volume: 0.5 ml
Solvent flow rate: 1 ml/min
Sample residence time in apparatus: 30 minutes (5 minutes for polystyrene)

The following components were used in the examples and comparative examples.

(a-1) Non-coordinating Ion-containing Compounds
N,N-dimethylanilinium[4-(chlorodimethylsilyl)-2,3,5,6-tetrafluorophenyl]tris(pentafluorophenyl)borate (CMSB)
N,N-dimethylanilinium(4-trichlorosilyl-2,3,5,6-tetrafluorophenyl)tris(pentafluorophenyl)borate (TCSB)
N,N-dimethylanilinium(4-trimethoxysilyl-2,3,5,6-tetrafluorophenyl)tris(pentafluorophenyl)borate (TMSB)

(a-2) Fine Particulate Carriers
Silica (dried for 5 hours at 110° C. under a nitrogen stream; hydroxyl group content: 4.4 mmol/g)
Magnesium Chloride (B) Metallocene Compounds
Bis[2-methyl-4-phenyl-($\eta^5$-1-indenyl)]dimethylsilane zirconium dichloride (MPIZ)
Bis[2-methyl-4-(1-naphthyl)-($\eta^5$-1-indenyl)]dimethylsilane zirconium dichloride (MNIZ)
Bis[2-methyl-4,5-benzo-($\eta^5$-1-indenyl)]dimethylsilane zirconium dichloride (MBIZ)
1,2-Bis($\eta^5$-1-indenyl)ethanehafnium dichloride (EBIH)
Biscyclopentadienylzirconium dichloride (CPZ)

(C) Organic Aluminum Compounds
Tri-n-octylaluminum (TNOA)
Tri-n-hexylaluminum (TNHA)
Tri-n-butylaluminum (TNBA)

(D) Hydrocarbons
(D-1) White vaseline (melting point: 42° C. as measured according to JIS K2235; aerated with nitrogen at 500 ml/min for 6 hours while stirring at 60° C.)

(D-2) Liquid paraffin 1 (trade name: DAFNEOIL CP15N, product of Idemitsu Kosan Co., Ltd.; kinematic viscosity at 30° C.: 30.9 mm$^2$/s; aerated with nitrogen at 500 ml/min for 6 hours while stirring at 60° C.)

(D-3) Mixture of liquid paraffin (trade name: DAFNEOIL CP15N, product of Idemitsu Kosan Co., Ltd.; kinematic viscosity at 30° C.: 30.9 mm$^2$/s) and white vaseline (melting point: 42° C. as measured according to JIS K2235) in a weight ratio of 7:3 (The mixture was aerated with nitrogen at 500 ml/min for 6 hours while stirring at 60° C.)

(D-4) Paraffin wax (trade name PARAFFIN WAX 150, product of Nihon Seiro Co., Ltd.; melting point: 66° C.; aerated with nitrogen at 500 ml/min for 6 hours while stirring at 70° C.)

(D-5) Microcrystalline wax (trade name: MICROCRYSTALLINE WAX Hi-Mic-1080, product of Nihon Seiro Co., Ltd.; melting point: 83° C.; aerated with nitrogen at 300 ml/min for 6 hours while stirring at 90° C.)

(D-6) Liquid paraffin 2 (trade name: DAFNEOIL CP68N, product of Idemitsu Kosan Co., Ltd.; kinematic viscosity at 30° C.: 114 mm$^2$/s; aerated with nitrogen at 500 ml/min for 6 hours while stirring at 60° C.)

EXAMPLE 1

1) Preparation of Cocatalyst Component (A) comprising Non-coordinating Ion-containing Compound Bonded By Chemical Bonding to Fine Particulate Carrier A solution of 0.3 g of CMSB as an ionic compound (a-1) in 6 ml of dichloromethane was combined with a slurry of 0.5 g of silica (dried for 5 hours at 110° C. under a nitrogen stream) as a fine particulate carrier (a-2) in 30 ml of dichloromethane, and the mixture was refluxed for 2 hours while stirring. Next, 3 ml of trimethylchlorosilane as (a-3) was added, and the mixture was further refluxed for 2 hours while stirring. The supernatant was removed and washing was performed 3 times with 30 ml of dichloromethane to obtain a cocatalyst. The non-coordinating ion-containing compound content was 0.12 mmol/g as determined from the boron content. The hydroxyl group content was 1.9 mmol/g.

2) Preparation of Olefin Polymerization Catalyst Component

A 100 mg portion of component (A) was placed in a 30 ml flask under a nitrogen stream, and then 1 ml of a solution of 5.0 mmol/L of (B) MPIZ in dichloromethane was added and the mixture was stirred at room temperature for 1 hour. The dichloromethane was then distilled off under a nitrogen stream to obtain a light yellow catalyst component.

A 20 mg portion of the catalyst component was then placed in a 30 ml flask under a nitrogen stream. Next, 0.2 g of molten (D-1) was added to the flask and mixed therewith to prepare an olefin polymerization catalyst component.

3) Preparation of Olefin Polymerization Catalyst

After storing the olefin polymerization catalyst component prepared in 2) above for 8 days at room temperature, 2.0 ml of (C) a solution of 0.5 mol/L of TNOA in hexane was added and the mixture was stirred at 40° C. for 30 minutes to prepare an olefin polymerization catalyst. The (C) organometallic compound was used in a molar ratio of 1000 with respect to the (B) metallocene compound.

4) Polymerization of Propylene

After adding 2 ml of a solution of 0.5 mol/L of TNOA in hexane and 8 mol of propylene to a 6.0 liter autoclave and raising the temperature to 70° C., the aforementioned polymerization catalyst was injected into the autoclave. Polymerization was conducted for 30 minutes, and then the unreacted propylene was removed to obtain a propylene polymer. The results are shown in Table 1.

EXAMPLES 2 AND 3

These examples were carried out in the same manner as Example 1, except for using 40 mg and 100 mg of the olefin polymerization catalyst component, respectively, and using the components (D) listed in Table 1. The (C) organometallic compound was used in a molar ratio of 500 and 200 with respect to the (B) metallocene compound. The results are shown in Table 1.

EXAMPLES 4–8

These examples were carried out in the same manner as Example 1, except for using the (B), (C) and (D) components listed in Table 1. The results are shown in Table 1.

EXAMPLE 9

This example was carried out in the same manner as Example 1, except that propylene-ethylene copolymer was produced by the following procedure.

Copolymerization of propylene and ethylene

After adding 2 ml of a solution of 0.5 mol/L of TNOA in hexane and 32 mol of propylene in a 6.0 liter autoclave and raising the temperature to 65° C., the polymerization catalyst prepared in Example 1 was injected into the autoclave and additional prepolymerization was initiated. At 1 minute from the start of polymerization, ethylene was introduced to a partial pressure of 0.25 MPa, and the propylene and ethylene were copolymerized at 70° C. At 15 minutes from the start of ethylene introduction, the polymerization was suspended by injection of methanol. The unreacted propylene was removed to obtain a propylene polymer. The results are shown in Table 1.

EXAMPLES 10 AND 11

These examples were carried out in the same manner as Example 9, except for using half of the amount of (B) MPIZ, and using the components (D) listed in Table 1. The results are shown in Table 1. The (C) organometallic compound was used in a molar ratio of 500 with respect to the (B) metallocene compound.

EXAMPLES 12–23

These examples were carried out in the same manner as Example 9, except for using the (B), (C) and (D) components listed in Table 1, and producing the propylene-ethylene copolymer with the ethylene partial pressures listed in Table 1. The results are shown in Table 1.

EXAMPLE 24

1) Preparation of Cocatalyst Component (A) Comprising Non-coordinating Ion-containing Compound Bonded By Chemical Bonding to Fine Particulate Carrier This was conducted in the same manner as Example 1, except for using TCSB instead of CMSB. The non-coordinating ion-containing compound content was 0.20 mmol/g as determined from the boron content. The hydroxyl group content was 1.6 mmol/g.

The procedure was carried out in a similar manner except for using (A) prepared above and the (B), (C) and (D) components listed in Table 1, and producing the propylene-ethylene copolymer with the ethylene partial pressure listed in Table 1. The results are shown in Table 1.

EXAMPLE 25

1) Preparation of Cocatalyst Component (A) Comprising Non-coordinating Ion-containing Compound Bonded By Chemical Bonding to Fine Particulate Carrier This was conducted in the same manner as Example 1, except for using 0.2 g of CMSB. The non-coordinating ion-containing compound content was 0.08 mmol/g as determined from the boron content. The hydroxyl group content was 2.2 mmol/g.

2) Preparation of Olefin Polymerization Catalyst Component

A 100 mg portion of component (A) prepared in 1) above was placed in a 30 ml flask under a nitrogen stream, and then 1 ml of a solution of 5.0 mmol/L of (B) MPIZ in dichloromethane was added and the mixture was stirred at room temperature for 1 hour. The dichloromethane was then distilled off under a nitrogen stream to obtain a light yellow catalyst component.

3) Preparation of Olefin Polymerization Catalyst

A 20 mg portion of the olefin polymerization catalyst component prepared in 1) above was then placed in a 30 ml flask under a nitrogen stream, and 0.2 ml of (C) a solution of 0.5 mol/L of TNOA in hexane was added and the mixture was stirred at room temperature for 10 minutes. The hexane was then distilled off under a nitrogen stream to obtain a red polymerization catalyst. Next, 0.2 g of (D-1) was added to the polymerization catalyst and mixed therewith to prepare an olefin polymerization catalyst. After storing the olefin polymerization catalyst component for 8 days at room temperature, 1.8 ml of (C) a solution of 0.5 mol/L of TNOA in hexane was added and the mixture was stirred at 40° C. for 10 minutes. This olefin polymerization catalyst was used for polymerization of propylene. The (C) organometallic compound was used in a molar ratio of 1000 with respect to the (B) metallocene compound.

4) Polymerization of Propylene

Polymerization of propylene was carried out in the same manner as Example 1 using the olefin polymerization catalyst prepared in 2) above. The results are shown in Table 2.

EXAMPLES 26–32

These examples were carried out in the same manner as Example 25 except for using the components listed in Table 2. The results are shown in Table 2.

EXAMPLES 33–40

These examples were carried out in the same manner as Example 9, except for using the components listed in Table 2, using an olefin polymerization catalyst prepared in the same manner as Example 25 stored for 8 days, and copolymerizing the propylene and ethylene with ethylene partial pressures listed in Table 2. The results are shown in Table 2.

EXAMPLE 41

Preparation of Cocatalyst Component (A) Comprising Non-coordinating Ion-containing Compound Bonded By Chemical Bonding to Fine Particulate Carrier This was conducted in the same manner as Example 1, except for using phenyldimethylchlorosilane instead of trimethylchlorosilane. The non-coordinating ion-containing compound content was 0.10 mmol/g as determined from the boron content. The hydroxyl group content was 2.6 mmol/g.

2) Preparation of Olefin Polymerization Catalyst Component

A 100 mg portion of component (A) prepared in 1) above was placed in a 30 ml flask under a nitrogen stream, and then 1 ml of a solution of 5.0 mmol/L of (B) MPIZ in dichloromethane was added and the mixture was stirred at room temperature for 1 hour. The dichloromethane was then distilled off under a nitrogen stream to obtain a light yellow catalyst component.

A 0.2 g portion of (D-1) was added to a nitrogen-substituted 30 ml flask, and then 0.27 mmol of TNOA was added to the flask and the mixture was stirred at 50° C. for 10 minutes. The total amount of the aforementioned catalyst component was added to the mixture and mixed therewith to prepare an olefin polymerization catalyst component.

3) Polymerization of Propylene

After storing 80 mg of the olefin polymerization catalyst component prepared in 2) above (the weight includes the white vaseline and TNOA) for 8 days at room temperature, 1.0 ml of (C) a solution of 0.5 mol/L of TNOA in hexane was added and the mixture was heated at 50° C. for 5 minutes while stirring. The (C) organometallic compound was used in a molar ratio of 540 with respect to the (B) metallocene compound. The polymerization catalyst was used for polymerization of propylene in the same manner as Example 1. The results are shown in Table 2.

EXAMPLE 42

1) Preparation of Olefin Polymerization Catalyst

A 100 mg portion of component (A) of Example 1 was placed in a 30 ml flask under a nitrogen stream, and then 1 ml of a solution of 5.0 mmol/L of (B) MPIZ in dichloromethane and 1.0 ml of a solution of 5.0 mmol/L of (C) TNOA in hexane were added and the mixture was stirred at room temperature for 30 minutes. The dichloromethane and hexane were then distilled off under a nitrogen stream to obtain a light green polymerization catalyst. After then placing 30 mg of the polymerization catalyst into a 30 ml flask under a nitrogen stream, 0.3 g of (D-1) was added and mixed therewith to prepare an olefin polymerization catalyst component.

2) Polymerization of Propylene

Polymerization of propylene was carried out in the same manner as Example 1 after storing the total amount of the olefin polymerization catalyst component prepared in 1) above for 8 days at room temperature. The results are shown in Table 2.

EXAMPLE 43

This example was carried out in the same manner as Example 1, except for using the component prepared in the following manner as component (A) and MBIZ as the (B) metallocene compound. The results are shown in Table 2.

1) Preparation of Cocatalyst Component (A) Comprising non-coordinating Ion-containing Compound Bonded By Chemical Bonding to Fine Particulate Carrier After adding 1.8 g of magnesium chloride to 70 ml of tetrahydrofuran, the mixture was refluxed for 3 hours. To the resulting colorless transparent solution there was added 5.0 ml of a solution of 0.17 mol/L N,N-dimethylanilinium (4-trimethoxysilyl-2,3,5,6-tetrafluorophenyl)tris(pentafluorophenyl)borate in dichloromethane as an ionic compound (a-1), and the mixture was refluxed for 3 hours. The tetrahydrofuran was then distilled off, and the precipitated solid was dried under reduced pressure for 4 hours at 150° C. Washing was then performed 3 times with 80 ml of dichloromethane to obtain a cocatalyst component.

EXAMPLES 44–46

These examples were carried out in the same manner as Example 9, Example 25 and Example 42, respectively, except for using no trimethylchlorosilane for preparation of the cocatalyst component (A). The non-coordinating ion-containing compound content of component (A) was 0.15 mmol/g as determined from the boron content. The hydroxyl group content was 4.3 mmol/g. The results are shown in Table 2.

EXAMPLES 47–49

These examples were carried out in the same manner as Example 9, Example 25 and Example 42, respectively, except that the olefin polymerization catalyst component was stored at room temperature for 30 days. The results are shown in Tables 2 and 3.

EXAMPLES 50–52

These examples were carried out in the same manner as Example 9, Example 25 and Example 42, respectively, except that the olefin polymerization catalyst component was used without storage. The results are shown in Table 3.

EXAMPLES 53–55

These examples were carried out in the same manner as Example 9, Example 25 and Example 42, respectively, except that the olefin polymerization catalyst component was stored at 5° C. for 30 days. The results are shown in Table 3.

EXAMPLE 56

An olefin polymerization catalyst was prepared in the same manner as Example 1, except for using CPZ and TNBA as the (B) metallocene compound and (C) organic aluminum compound, respectively.

1) Polymerization of Ethylene

After adding 0.5 ml of a solution of 600 ml of isobutane and 0.2 mol/l of n-butyllithium in hexane into a 1.5 L autoclave, the temperature was raised to 70° C. Ethylene was introduced into the autoclave to a partial pressure of 1.0 MPa. The olefin polymerization catalyst was injected into the autoclave for polymerization for 30 minutes while continuously supplying ethylene at a partial pressure of 1.0 MPa. The results are shown in Table 3.

EXAMPLE 57

1) Preparation of Olefin Polymerization Catalyst

A 30 mg portion of cocatalyst component (A) prepared in Example 1 was placed in a 30 ml flask under a nitrogen stream. Next, 2.0 ml of a solution of (B) MPIZ and (C) TNOA in hexane (at respective concentrations of 0.5 millimole/L and 0.5 mol/L) was added to the flask and an olefin polymerization catalyst was obtained by stirring at 30° C. for 10 minutes.

2) Prepolymerization of Propylene

After substituting a 100 ml flask with propylene gas, the total amount of the olefin polymerization catalyst prepared in 1) above was added and the mixture was stirred at room temperature for 2 hours for prepolymerization of the propylene. The propylene was prepolymerized at 10 g per gram of the cocatalyst component (A). The catalyst used for the prepolymerization was stored at room temperature for 7 days and then used for polymerization of propylene in the same manner as Example 1. The results are shown in Table 4.

EXAMPLES 58–63

These examples were carried out in the same manner as Example 57, except that propylene and ethylene were copolymerized in the same manner as Example 9 with the ethylene partial pressure listed in Table 1, using the components listed in Table 1. The results are shown in Table 4.

EXAMPLES 64 AND 65

These examples were carried out in the same manner as Example 57 and Example 59, respectively, except that ethylene was used instead of propylene for the prepolymerization. The results are shown in Table 4.

EXAMPLES 66 AND 67

These examples were carried out in the same manner as Example 57 and Example 59, respectively, except that no trimethylchlorosilane was used for preparation of the cocatalyst component (A). The non-coordinating ion-containing compound content of component (A) was 0.15 mmol/g as determined from the boron content. The hydroxyl group content was 4.3 mmol/g. The results are shown in Table 4.

EXAMPLES 68 AND 69

These examples were carried out in the same manner as Example 57 and Example 59, respectively, except that the olefin polymerization catalyst was stored at room temperature for 30 days. The results are shown in Table 4.

EXAMPLES 70–72

These examples were carried out in the same manner as Example 57, Example 59 and Example 60, respectively, except that the olefin polymerization catalyst was used without storage. The results are shown in Table 4.

EXAMPLES 73–75

These examples were carried out in the same manner as Example 57, Example 59 and Example 60, respectively, except that the olefin polymerization catalyst was stored at 5° C. for 30 days. The results are shown in Table 4.

EXAMPLES 76–80

These examples were carried out in the same manner as Example 57, Example 59, Example 60, Example 62 and Example 63, respectively, except that the prepolymerization degrees were as listed in the table. The results are shown in Table 4.

Comparative Examples 1 and 2

These comparative examples were carried out in the same manner as Example 9, except that hexane (kinematic viscosity of 0.5 mm$^2$/s at 30° C.) and kerosene (kinematic viscosity of 2.4 mm$^2$/s at 30° C.) were used as component (D), respectively, and the olefin polymerization catalyst component was stored at room temperature for 1 day. The results are shown in Table 5.

Comparative Examples 3 and 4

These comparative examples were carried out in the same manner as Comparative Examples 1 and 2, except that the olefin polymerization catalyst component was stored at room temperature for 7 days. The results are shown in Table 5.

Comparative Examples 5 and 6

These comparative examples were carried out in the same manner as Example 33, except that hexane and kerosene were used as component (D), respectively, and the olefin polymerization catalyst was stored at room temperature for 1 day. The results are shown in Table 5.

Comparative Examples 7 and 8

These comparative examples were carried out in the same manner as Comparative Examples 5 and 6, respectively, except that the olefin polymerization catalyst was stored at room temperature for 7 days. The results are shown in Table 5.

EXAMPLE 81

This example was carried out in the same manner as Example 1, except for adding 640 ml of hydrogen during the polymerization. The results are shown in Table 5.

Comparative Examples 9 and 10

These comparative examples were carried out in the same manner as Example 1, except for adding 1300 ml and 1000 ml of hydrogen, respectively, during the polymerization. The results are shown in Table 5.

Comparative Example 11

This comparative example was carried out in the same manner as Example 1, except for using bis[2-methyl-4-phenyl-($\eta^5$-1-indenyl)]dimethylsilanezirconium dimethyl (MPIZM) instead of MPIZ, and using no component (C), to obtain a small amount of polymer. The results are shown in Table 5.

Comparative Example 12

This comparative example was carried out in the same manner as Example 1, except for using no component (C); however, no polymer was obtained.

Comparative Example 13

1) Preparation of Polymerization Catalyst

To a 50 ml flask there were added 0.5 g of silica (dried for 5 hours at 110° C. under a nitrogen stream) and 10 ml of hexane. After adding 3 ml of trimethylchlorosilane to the mixture, it was refluxed for 2 hours while stirring. The supernatant was then removed off, and washing was performed 3 times with 10 ml of hexane. After next adding 6 ml of a solution of N,N-dimethylaniliniumtetrakis(pentafluorophenyl)borate in dichloromethane (0.5 millimole/ml), 6 ml of a solution of MPIZ in dichloromethane (0.5 millimole/ml) and 1 ml of a solution of 0.5 mol/L of triisobutylaluminum in hexane to the flask, the mixture was stirred at room temperature for 10 minutes. The dichloromethane was then distilled off under a nitrogen stream. A 1.0 g portion of (D-2) was added to and mixed with the obtained solid to obtain a polymerization catalyst.

After storing the catalyst at room temperature for 7 days, polymerization of propylene was carried out in the same manner as Example 1. The results are shown in Table 5.

EXAMPLE 82

1) Preparation of Cocatalyst Component (A)

A 200 g portion of (a-2) silica was placed in a 5 liter flask and then dried for 6 hours at 120° C. under a nitrogen stream. After cooling it to room temperature, 1.2 liters of dichloromethane was added, and a solution of 55 g of (a-1) N,N-dimethylanilinium[4-(methyldichlorosilyl)-2,3,5,6-tetrafluorophenyl]tris(pentafluorophenyl)borate in 500 ml of dichloromethane was added dropwise over a period of 2 hours while stirring. After refluxing for 2 hours, 76 ml of trimethylchlorosilane was added as component (a-3), and refluxing was continued for 2 hours. The mixture was cooled to room temperature and allowed to stand, and the supernatant liquid was removed off. This was followed by washing 5 times with 2.5 liters of dichloromethane. The non-coordinating ion content was 0.14 mmol/g as determined from the boron content.

2) Preparation of Olefin Polymerization Catalyst

A 0.72 g portion of (B) MNIZ was placed in a dried, nitrogen-substituted 3-liter flask. After adding 1.0 liter of a solution of 0.5 mol/L of TNOA in hexane as component (C) and 0.7 liter of hexane into the flask, the mixture was stirred to dissolve the MNIZ. A 30 g portion of the cocatalyst component (A) prepared above was added to the mixture, and stirring was continued for 30 minutes at 30° C. to prepare an olefin polymerization catalyst.

3) Prepolymerization of Propylene

A Tedlar bag filled with 50 liters of propylene was mounted on the flask of 2) above. Prepolymerization was initiated by replacing the nitrogen in the flask with the propylene gas in the Tedlar bag while stirring. The prepolymerization was thereafter conducted by stirring at room temperature for 2 hours. Propylene was prepolymerized at 1.8 g per gram as the total of the cocatalyst component (A) and (B).

4) Polymerization of Propylene

Propylene and hydrogen were supplied to a 150-liter loop polymerization reactor (first polymerization reactor) at rates of 60 kg/hr and 4.0 g/hr, respectively. Next, the olefin polymerization catalyst prepared in 3) above and a solution of 0.5 mol/L of TNOA in hexane were supplied to the first polymerization reactor with hexane at 20 kg/hr (corresponding to supply rates of 0.2 g/hr and 0.1 mol/hr of cocatalyst component (A)), for additional prepolymerization at 25° C. The reaction mixture discharged from the first polymerization reactor was continuously supplied to a 290-liter second loop flow polymerization reactor set to 70° C. To the second polymerization reactor there were continuously supplied propylene at 50 kg/hr, ethylene at 3.0 kg/hr and hydrogen at 4.5 g/hr, for continuous polymerization. A propylene copolymer with an MFR of 5.1 g/10 min was produced at a rate of 31 kg/hr. The propylene copolymer was produced in an amount of 150,000 g per gram of the cocatalyst component (A). The ethylene content of the obtained propylene copolymer was 3.9 wt %, the xylene soluble portion was 0.4 wt %, and the molecular weight distribution Mw/Mn was 2.8.

EXAMPLE 83

This example was carried out in the same manner as Example 82, except for further adding 5.0 g of (D-3) per gram of the prepolymerization catalyst (as cocatalyst component (A)). The propylene copolymer was produced in an amount of 140,000 g per gram of the cocatalyst component (A). The ethylene content of the obtained propylene copolymer was 3.9 wt %, the xylene soluble portion was 0.5 wt %, and the molecular weight distribution Mw/Mn was 2.9.

TABLE 1

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | ← | ← | ← | ← | ← | ← |
| (a-2) Fine particulate carrier | Silica | ← | ← | ← | ← | ← | ← | ← | ← | ← | ← | ← |
| Hydroxyl group content (mmol/g) | 1.9 | 1.9 | 1.9 | 1.9 | 1.9 | 1.9 | 1.9 | 1.9 | 1.9 | 1.9 | 1.9 | 1.9 |
| (B) Metallocene | MPIZ | ← | ← | ← | ← | ← | MBIZ | EBIH | MPIZ | ← | ← | ← |
| (C) Organic aluminum | TNOA | ← | ← | ← | ← | ← | ← | TNBA | TNOA | ← | ← | ← |
| (D) Hydrocarbon compound | D-1 | D-1 | D-3 | D-4 | D-5 | D-6 | D-1 | ← | ← | D-2 | D-3 | D-4 |
| Days stored | 8 | 8 | 8 | 8 | 8 | 8 | 8 | 8 | 8 | 8 | 8 | 8 |
| Ethylene partial pressure (MPa) | — | — | — | — | — | — | — | — | 0.25 | ← | ← | ← |
| Polymerization activity (kg/g − (A) · h) | 13 | 12 | 14 | 13 | 14 | 12 | 8.7 | 3.2 | 120 | 130 | 100 | 110 |
| Bulk density (g/cm$^3$) | 0.41 | 0.40 | 0.42 | 0.39 | 0.42 | 0.41 | 0.40 | 0.38 | 0.40 | 0.40 | 0.39 | 0.39 |
| Fouling | no | no | no | no | no | no | no | no | no | no | no | no |
| Xylene-soluble portion (wt %) | 0.2 | 0.2 | 0.1 | 0.2 | 0.1 | 0.3 | 0.3 | 0.3 | 0.2 | 0.1 | 0.2 | 0.2 |
| Mw/Mn | 2.9 | 3.1 | 2.9 | 3.0 | 3.2 | 3.1 | 2.8 | 3.1 | 2.9 | 3.0 | 2.9 | 3.1 |

TABLE 1-continued

| | | | | | | | | | | | | |
|---|---|---|---|---|---|---|---|---|---|---|---|---|
| Mw × 1000 | 1020 | 990 | 1080 | 1100 | 980 | 1010 | 182 | 214 | 220 | 203 | 228 | 218 |
| MFR (g/10 min) | 0.05 | 0.05 | 0.05 | 0.05 | 0.05 | 0.05 | 20.5 | 10.7 | 12.4 | 13.1 | 10.9 | 11.4 |
| Melting point (° C.) | 151 | 152 | 151 | 153 | 152 | 152 | 144 | 131 | 131 | 132 | 129 | 131 |
| Ethylene content (wt %) | — | — | — | — | — | — | — | — | 3.1 | 2.9 | 3.2 | 3.1 |

| | Example 13 | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | ← | ← | ← | ← | ← | TCSB |
| (a-2) Fine particulate carrier | Silica | ← | ← | ← | ← | ← | ← | ← | ← | ← | ← | ← |
| Hydroxyl group content (mmol/g) | 1.9 | 1.9 | 1.9 | 1.9 | 1.9 | 1.9 | 1.9 | 1.9 | 1.9 | 1.9 | 1.9 | 1.6 |
| (B) Metallocene | MPIZ | ← | ← | ← | ← | ← | MNIZ | ← | ← | ← | MBIZ | MNIZ |
| (C) Organic aluminum | TNOA | ← | TNHA | TNBA | TNOA | ← | ← | ← | ← | ← | ← | ← |
| (D) Hydrocarbon compound | D-5 | D-6 | D-3 | ← | ← | D-6 | D-3 | ← | ← | D-4 | D-3 | ← |
| Days stored | 8 | 8 | 8 | 8 | 8 | 8 | 8 | 8 | 8 | 8 | 8 | 8 |
| Ethylene partial pressure (MPa) | 0.25 | ← | ← | ← | 0.1 | ← | ← | 0.25 | 0.4 | 0.25 | 0.1 | 0.25 |
| Polymerization activity (kg/g − (A) · h) | 120 | 110 | 100 | 80 | 68 | 59 | 46 | 102 | 112 | 97 | 56 | 89 |
| Bulk density (g/cm$^3$) | 0.40 | 0.41 | 0.39 | 0.36 | 0.41 | 0.40 | 0.42 | 0.40 | 0.40 | 0.41 | 0.36 | 0.39 |
| Fouling | no | no | no | no | no | no | no | no | no | no | no | no |
| Xylene-soluble portion (wt %) | 0.3 | 0.1 | 0.2 | 0.2 | 0.2 | 0.2 | 0.2 | 0.2 | 0.3 | 0.2 | 0.2 | 0.3 |
| Mw/Mn | 3.2 | 3.1 | 2.8 | 3.1 | 3.1 | 3.0 | 2.9 | 3.0 | 3.2 | 3.1 | 3.2 | 2.9 |
| Mw × 1000 | 221 | 235 | 208 | 193 | 271 | 291 | 782 | 731 | 698 | 702 | 161 | 721 |
| MFR (g/10 min) | 11.8 | 9.8 | 12.3 | 16.3 | 4.2 | 3.6 | 0.2 | 0.3 | 0.4 | 0.3 | 32 | 0.3 |
| Melting point (° C.) | 130 | 131 | 129 | 130 | 138 | 140 | 139 | 131 | 124 | 130 | 135 | 129 |
| Ethylene content (wt %) | 3.1 | 3.0 | 3.3 | 3.0 | 1.3 | 1.5 | 1.5 | 3.1 | 4.2 | 3.0 | 1.4 | 2.9 |

TABLE 2

| | Example 25 | Example 26 | Example 27 | Example 28 | Example 29 | Example 30 | Example 31 | Example 32 | Example 33 | Example 34 | Example 35 | Example 36 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | ← | ← | ← | ← | ← | ← |
| (a-2) Fine particulate carrier | Silica | ← | ← | ← | ← | ← | ← | ← | ← | ← | ← | ← |
| Hydroxyl group content (mmol/g) | 2.2 | 2.2 | 2.2 | 2.2 | 2.2 | 2.2 | 2.2 | 2.2 | 2.2 | 2.2 | 2.2 | 2.2 |
| (B) Metallocene | MPIZ | ← | ← | ← | ← | ← | MBIZ | EBIH | MPIZ | ← | ← | ← |
| (C) Organic aluminum | TNOA | ← | ← | ← | ← | ← | ← | TNBA | TNOA | ← | ← | ← |
| (D) Hydrocarbon compound | D-1 | D-2 | D-3 | D-4 | D-5 | D-6 | D-1 | ← | ← | D-2 | D-3 | D-4 |
| Days stored | 8 | 8 | 8 | 8 | 8 | 8 | 8 | 8 | 8 | 8 | 8 | 8 |
| Ethylene partial pressure (MPa) | — | — | — | — | — | — | — | — | 0.25 | ← | ← | ← |
| Polymerization activity (kg/g − (A) · h) | 13 | 15 | 13 | 12 | 15 | 13 | 9.8 | 4.1 | 120 | 130 | 100 | 110 |
| Bulk density (g/cm$^3$) | 0.41 | 0.40 | 0.42 | 0.40 | 0.42 | 0.41 | 0.40 | 0.37 | 0.40 | 0.40 | 0.39 | 0.39 |
| Fouling | no | no | no | no | no | no | no | no | no | no | no | no |
| Xylene-soluble portion (wt %) | 0.2 | 0.2 | 0.1 | 0.2 | 0.2 | 0.2 | 0.3 | 0.3 | 0.2 | 0.2 | 0.2 | 0.2 |
| Mw/Mn | 3.1 | 3.1 | 2.9 | 3.0 | 3.2 | 3.1 | 3.2 | 3.1 | 2.9 | 3.1 | 2.9 | 3.1 |
| Mw × 1000 | 1023 | 1100 | 980 | 1030 | 1120 | 1020 | 203 | 226 | 209 | 210 | 231 | 221.0 |
| MFR (g/10 min) | 0.05 | 0.05 | 0.05 | 0.05 | 0.05 | 0.05 | 13.1 | 10.6 | 12.4 | 13.1 | 10.9 | 11.4 |
| Melting point (° C.) | 152 | 152 | 151 | 153 | 153 | 152 | 145 | 130 | 130 | 131 | 129 | 131 |
| Ethylene content (wt %) | — | — | — | — | — | — | — | — | 3.1 | 2.9 | 3.2 | 3.1 |

| | Example 37 | Example 38 | Example 39 | Example 40 | Example 41 | Example 42 | Example 43 | Example 44 | Example 45 | Example 46 | Example 47 | Example 48 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | TMSB | CMSB | ← | ← | ← | ← |
| (a-2) Fine particulate carrier | Silica | ← | ← | ← | ← | ← | MgCl$_2$ | Silica | ← | ← | ← | ← |
| Hydroxyl group content (mmol/g) | 2.2 | 2.2 | 2.2 | 2.2 | 2.6 | 1.9 | — | 4.3 | 4.3 | 4.3 | 1.9 | 2.2 |
| (B) Metallocene | MPIZ | ← | MNIZ | ← | MPIZ | ← | MBIZ | MPIZ | ← | ← | ← | ← |
| (C) Organic aluminum | TNOA | ← | ← | ← | ← | ← | ← | ← | ← | ← | ← | ← |
| (D) Hydrocarbon compound | D-5 | D-6 | D-3 | ← | D-1 | ← | ← | ← | ← | ← | ← | ← |
| Days stored | 8 | 8 | 8 | 8 | 8 | 8 | 8 | 8 | 8 | 8 | 30 | 30 |
| Ethylene partial pressure (MPa) | 0.25 | ← | ← | 0.4 | — | — | — | 0.25 | — | — | 0.25 | — |

TABLE 2-continued

| | | | | | | | | | | | | |
|---|---|---|---|---|---|---|---|---|---|---|---|---|
| Polymerization activity (kg/g − (A) · h) | 120 | 110 | 100 | 80 | 11 | 10 | 1.2 | 89 | 9.7 | 9.3 | 100 | 12 |
| Bulk density (g/cm³) | 0.40 | 0.41 | 0.39 | 0.36 | 0.40 | 0.40 | 0.38 | 0.38 | 0.37 | 0.37 | 0.39 | 0.41 |
| Fouling | no | no | no | no | no | no | no | no | no | no | no | no |
| Xylene-soluble portion (wt %) | 0.3 | 0.1 | 0.2 | 0.2 | 0.2 | 0.2 | 0.2 | 0.4 | 0.4 | 0.4 | 0.2 | 0.2 |
| Mw/Mn | 3.2 | 3.1 | 2.9 | 3.1 | 2.9 | 3.1 | 2.9 | 3.1 | 3.2 | 3.1 | 2.9 | 3.1 |
| Mw × 1000 | 210 | 235 | 680 | 682 | 1020 | 980 | 302 | 210.0 | 1030 | 1070 | 239 | 1000 |
| MFR (g/10 min) | 11.8 | 9.8 | 0.3 | 0.4 | 0.05 | 0.06 | 2.2 | 12.5 | 0.05 | 0.05 | 9.8 | 0.05 |
| Melting point (° C.) | 130 | 131 | 129 | 122 | 153 | 152 | 147 | 131 | 151 | 153 | 129 | 152 |
| Ethylene content (wt %) | 3.0 | 3.0 | 3.3 | 4.2 | — | — | — | 3.1 | — | — | 3.3 | — |

TABLE 3

| | Example 49 | Example 50 | Example 51 | Example 52 | Example 53 | Example 54 | Example 55 | Example 56 |
|---|---|---|---|---|---|---|---|---|
| (A) Cocatalyst component | | | | | | | | |
| (a-1) Non-coordinating ion-containing compound | CMSB | ← | ← | ← | ← | ← | ← | ← |
| (a-2) Fine particulate carrier | Silica | ← | ← | ← | ← | ← | ← | ← |
| Hydroxyl group content (mmol/g) | 1.9 | 1.9 | 2.2 | 1.9 | 1.9 | 2.2 | 1.9 | 1.9 |
| (B) Metallocene | MPIZ | ← | ← | ← | ← | ← | ← | CPZ |
| (C) Organic aluminum | TNOA | ← | ← | ← | ← | ← | ← | TNBA |
| (D) Hydrocarbon compound | D-1 | ← | ← | ← | ← | ← | ← | ← |
| Days stored | 30 | 0 | 0 | 0 | 30 | 30 | 30 | 8 |
| Ethylene partial pressure (MPa) | — | 0.25 | — | — | 0.25 | — | — | — |
| Polymerization activity (kg/g − (A) · h) | 13 | 105 | 13 | 12 | 112 | 11 | 14 | 3.5 |
| Bulk density (g/cm³) | 0.40 | 0.41 | 0.40 | 0.40 | 0.41 | 0.40 | 0.40 | 0.41 |
| Fouling | no | no | no | no | no | no | no | no |
| Xylene-soluble portion (wt %) | 0.2 | 0.2 | 0.2 | 0.2 | 0.2 | 0.2 | 0.2 | 0.2 |
| Mw/Mn | 2.9 | 3.1 | 2.9 | 3.1 | 3.1 | 2.9 | 3.0 | 3.1 |
| Mw × 1000 | 970 | 212.0 | 1000 | 970.0 | 203.0 | 1100 | 990.0 | — |
| MFR (g/10 min) | 0.05 | 11.8 | 0.05 | 0.06 | 13.4 | 0.05 | 0.06 | 0.02 |
| Melting point (° C.) | 153 | 130 | 152 | 153 | 129 | 152 | 153 | 138 |
| Ethylene content (wt %) | — | 3.1 | — | — | 3.2 | — | — | 100 |

TABLE 4

| | Example 57 | Example 58 | Example 59 | Example 60 | Example 61 | Example 62 | Example 63 | Example 64 | Example 65 | Example 66 | Example 67 | Example 68 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | ← | ← | ← | ← | ← | ← |
| (a-2) Fine particulate carrier | Silica | ← | ← | ← | ← | ← | ← | ← | ← | ← | ← | ← |
| Hydroxyl group content (mmol/g) | 1.9 | 1.9 | 1.9 | 1.9 | 1.9 | 1.9 | 1.9 | 1.9 | 1.9 | 4.6 | 4.6 | 1.9 |
| (B) Metallocene | MPIZ | ← | ← | ← | MNIZ | ← | ← | MPIZ | ← | ← | ← | ← |
| (C) Organic aluminum | TNOA | ← | ← | ← | ← | ← | ← | ← | ← | ← | ← | ← |
| Prepolymerization | Propylene | ← | ← | ← | ← | ← | ← | Ethylene | ← | Propylene | ← | ← |
| Prepolymerization degree g/g − (A) | 10 | 9 | 12 | 11 | 14 | 8 | 12 | 21 | 15 | 11 | 12 | 9 |
| Prepolymer melting point (° C.) | 146.9 | 148.3 | 147.4 | 148.5 | 149.1 | 148.2 | 149.5 | 132 | 133 | 147.2 | 146.9 | 148.2 |
| Days stored | 7 | 7 | 7 | 7 | 7 | 7 | 7 | 7 | 7 | 7 | 7 | 30 |
| Ethylene partial pressure (MPa) | — | 0.1 | 0.25 | 0.4 | 0.1 | 0.25 | 0.4 | — | 0.25 | — | 0.25 | — |
| Polymerization activity (kg/g − (A) · h) | 11 | 63 | 99 | 120 | 43 | 79 | 100 | 13 | 107 | 8.9 | 76 | 12 |
| Bulk density (g/cm³) | 0.42 | 0.40 | 0.39 | 0.39 | 0.41 | 0.41 | 0.39 | 0.38 | 0.42 | 0.39 | 0.37 | 0.42 |
| Fouling | no | no | no | no | no | no | no | no | no | no | no | no |
| Xylene-soluble portion (wt %) | 0.2 | 0.2 | 0.2 | 0.3 | 0.2 | 0.1 | 0.2 | 0.2 | 0.2 | 0.3 | 0.4 | 0.2 |
| Mw/Mn | 3.1 | 3.2 | 2.9 | 3.1 | 3.2 | 3.1 | 2.9 | 3.1 | 3.2 | 3.1 | 3.2 | 3.1 |
| Mw × 1000 | 960 | 289 | 205 | 194 | 780 | 732 | 693 | 1000 | 202 | 1020 | 198 | 1000 |
| MFR (g/10 min) | 0.05 | 3.5 | 12.1 | 16.2 | 0.1 | 0.3 | 0.4 | 0.05 | 13.5 | 0.05 | 14.2 | 0.05 |
| Melting point (° C.) | 152 | 141 | 131 | 124 | 139 | 129 | 123 | 153 | 131 | 152 | 129 | 151 |
| Ethylene content (wt %) | — | 1.4 | 3.1 | 4.1 | 1.6 | 3.2 | 4.2 | — | 3.0 | — | 3.2 | — |

TABLE 4-continued

|  | Example 69 | Example 70 | Example 71 | Example 72 | Example 73 | Example 74 | Example 75 | Example 76 | Example 77 | Example 78 | Example 79 | Example 80 |
|---|---|---|---|---|---|---|---|---|---|---|---|---|
| (A) Cocatalyst component | | | | | | | | | | | | |
| (a-1) Non-coordinating ion-containing compound | CMSB | ← | ← | ← | ← | ← | ← | ← | ← | ← | ← | ← |
| (a-2) Fine particulate carrier | Silica | ← | ← | ← | ← | ← | ← | ← | ← | ← | ← | ← |
| Hydroxyl group content (mmol/g) | 1.9 | 1.9 | 1.9 | 1.9 | 1.9 | 1.9 | 1.9 | 1.9 | 1.9 | 1.9 | 1.9 | 1.9 |
| (B) Metallocene | MPIZ | ← | MNIZ | ← | MPIZ | ← | ← | ← | ← | ← | MNIZ | ← |
| (C) Organic aluminum | TNOA | ← | ← | ← | ← | ← | ← | ← | ← | ← | ← | ← |
| Prepolymerization | Propylene | ← | ← | ← | ← | ← | ← | ← | ← | ← | ← | ← |
| Prepolymerization degree g/g − (A) | 12 | 7 | 11 | 13 | 8 | 11 | 13 | 2 | 36 | 87 | 24 | 53 |
| Prepolymer melting point (° C.) | 148.2 | 147.2 | 146.9 | 148.3 | 147.4 | 148.5 | 149.1 | 148.2 | 149.5 | 146.9 | 148.1 | 147.4 |
| Days stored | 30 | 0 | 0 | 0 | 30 | 30 | 30 | 7 | 7 | 7 | 7 | 7 |
| Ethylene partial pressure (MPa) | 0.25 | — | 0.25 | 0.4 | — | 0.25 | 0.4 | — | 0.25 | 0.4 | 0.25 | 0.4 |
| Polymerization activity (kg/g − (A) · h) | 110 | 13 | 102 | 135 | 12 | 98 | 126 | 12 | 95 | 103 | 79 | 98 |
| Bulk density (g/cm³) | 0.39 | 0.41 | 0.4 | 0.38 | 0.41 | 0.4 | 0.38 | 0.42 | 0.39 | 0.41 | 0.4 | 0.38 |
| Fouling | no | no | no | no | no | no | no | no | no | no | no | no |
| Xylene-soluble portion (wt %) | 0.3 | 0.1 | 0.2 | 0.3 | 0.1 | 0.2 | 0.3 | 0.2 | 0.3 | 0.3 | 0.2 | 0.3 |
| Mw/Mn | 3.1 | 3.1 | 2.9 | 3.2 | 3.1 | 2.9 | 3.2 | 3.1 | 3.1 | 3.1 | 2.9 | 3.2 |
| Mw × 1000 | 209 | 990 | 198 | 191 | 1000 | 200 | 191 | 1000 | 210 | 18.4 | 710 | 698 |
| MFR (g/10 min) | 12.3 | 0.05 | 13.9 | 15.9 | 0.05 | 13.6 | 17.2 | 0.05 | 12.3 | 18.3 | 0.3 | 0.4 |
| Melting point (° C.) | 130 | 153 | 131 | 124 | 153 | 131 | 123 | 151 | 130 | 122 | 128 | 123 |
| Ethylene content (wt %) | 3.0 | — | 2.9 | 4.1 | — | 3.1 | 4.2 | — | 3.0 | 4.3 | 3.3 | 4.1 |

TABLE 5

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Example 81 | Comp. Ex. 9 | Comp. Ex. 10 | Comp. Ex. 11 | Comp. Ex. 12 | Comp. Ex. 13 |
|---|---|---|---|---|---|---|---|---|---|---|---|---|---|---|
| (A) Cocatalyst component | | | | | | | | | | | | | | |
| (a-1) Non-coordinating ion-containing compound | CMSB | ← | ← | ← | ← | ← | ← | ← | ← | ← | ← | ← | ← | * |
| (a-2) Fine particulate carrier | Silica | ← | ← | ← | ← | ← | ← | ← | ← | ← | ← | ← | ← | ← |
| Hydroxyl group content (mmol/g) | 1.9 | 1.9 | 1.9 | 1.9 | 2.2 | 2.2 | 2.2 | 2.2 | 1.9 | 1.9 | 1.9 | 1.9 | 1.9 | 1.2 |
| (B) Metallocene | MPIZ | ← | ← | ← | ← | ← | ← | ← | ← | ← | ← | MPIZM | MPIZ | MPIZ |
| (C) Organic aluminum | TNOA | ← | ← | ← | ← | ← | ← | ← | ← | ← | ← | — | — | TIBA |
| (D) Hydrocarbon compound | hexane | kerosene | hexane | kerosene | hexane | kerosene | hexane | kerosene | D-1 | D-1 | D-1 | D-1 | D-1 | D-2 |
| Days stored | 1 | 1 | 7 | 7 | 1 | 1 | 7 | 7 | 7 | 7 | 7 | 8 | 8 | 7 |
| Ethylene partial pressure (MPa) | 0.25 | 0.25 | 0.25 | 0.25 | 0.25 | 0.25 | 0.25 | 0.25 | — | — | — | — | — | — |
| Polymerization activity (kg/g − (A) · h) | 32 | 41 | 1.2 | 2.3 | 43 | 51 | 3.2 | 1.6 | 28 | 32 | 10 | 0.3 | 0 | 0.5 |
| Bulk density (g/cm³) | 0.31 | 0.29 | 0.22 | 0.14 | 0.35 | 0.34 | 0.21 | 0.23 | 0.35 | 0.28 | 0.29 | 0.23 | — | — |
| Fouling | no | no | yes | yes | no | no | yes | yes | no | yes | yes | yes | — | yes |
| Xylene-soluble portion (wt %) | 0.5 | 0.5 | 2.4 | 3.4 | 0.6 | 0.5 | 1.4 | 1.3 | 0.7 | 5.2 | 6.6 | 4.1 | — | 1.3 |
| Mw/Mn | 3.1 | 3.3 | 4.3 | 4.2 | 3.2 | 3.3 | 4.2 | 3.9 | 3.7 | 6 | 5.9 | 4.1 | — | — |
| Mw × 1000 | 205 | 195 | 192 | 241 | 233 | 220 | 240 | 228 | 97 | 22 | 45 | 980 | — | — |

TABLE 5-continued

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Example 81 | Comp. Ex. 9 | Comp. Ex. 10 | Comp. Ex. 11 | Comp. Ex. 12 | Comp. Ex. 13 |
|---|---|---|---|---|---|---|---|---|---|---|---|---|---|---|
| MFR (g/10 min) | 13.2 | 14.2 | 15.6 | 8.9 | 10.2 | 11.6 | 9.4 | 10.3 | 200 | — | — | — | — | — |
| Melting point (° C.) | 131 | 130 | 129 | 131 | 130 | 132 | 129 | 130 | 150 | 149 | 149 | — | — | — |
| Ethylene content (wt %) | 2.9 | 3.1 | 3.2 | 3.0 | 3.1 | 2.9 | 3.3 | 3.1 | — | — | — | — | — | — |

INDUSTRIAL APPLICABILITY

According to the present invention, there are provided an olefin polymerization catalyst which produces olefin polymers containing few solvent-soluble components without a wider molecular weight distribution, and which exhibits no significant reduction in activity even after storage, as well as olefin polymerization catalyst components and a method for their storage, and a process for the production of propylene polymers using them.

The invention claimed is:

1. An olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein the (D) hydrocarbon is at least one selected from the group consisting of the following (I) to (III):

(I) liquid hydrocarbons with a kinematic viscosity of 5.0 mm$^2$/s or greater at 30° C., (II) solid hydrocarbons other than crystalline olefin polymers, and (III) crystalline olefin polymers.

2. An olefin polymerization catalyst according to claim 1, wherein the (III) crystalline olefin polymers are one or more selected from the group consisting of the following (III-1) and (III-2):

(III-1) those wherein at least one olefin is prepolymerized by the olefin polymerization catalyst composed of (A), (B) and (C), with a melting point of 152.5° C. or below when the olefin is propylene, or the prepolymerization is conducted in a non-polymerizable medium, and (III-2) polyolefin waxes.

3. An olefin polymerization catalyst according to claim 1 or 2, wherein the (C) organometallic compound is used in a 10-fold molar amount or greater with respect to the (B) metallocene compound, or (D) is used in an amount of 20 to 5000 parts by weight to 100 parts by weight as the total of (A) and (B).

4. An olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein (A) is obtained by contacting a non-coordinating ion-containing compound (a-1) represented by the following general formula (1):

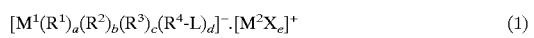　(1)

(wherein M$^1$ is boron or aluminum,

R$^1$, R$^2$ and R$^3$ are each independently a C$_{1-20}$ hydrocarbon group, a halogenated hydrocarbon group, an alkoxy group, a phenoxy group or a halogen atom, and may be the same or different, R$^4$ is a C$_{1-20}$ hydrocarbon group optionally containing a hetero atom, L is selected from among silyl, hydroxyl, carboxyl, amino, alkoxy, aryloxy and phosphino groups and alkyl or aryl groups having one or more of these groups, a, b and c are 0 or integers of 1–3, d is an integer of 1–4 and a+b+c+d=4,

[M$^2$X$_e$]$^+$ represents a monovalent cation,

M$^2$ is a cation of valence (e+1),

X is any desired anion, and e is a integer of 0–3)

with a fine particulate carrier (a-2), and the (D) hydrocarbon is at least one selected from the group consisting of the following (I) to (III):

(I) liquid hydrocarbons with a kinematic viscosity of 5.0 mm$^2$/s or greater at 30° C., (II) solid hydrocarbons other than crystalline olefin polymers, and (III) crystalline olefin polymers.

5. An olefin polymerization catalyst component comprising (A) a cocatalyst component wherein a non-coordinating ion-containing compound is chemically bonded to a fine particulate carrier, (B) a metallocene compound and (D) a hydrocarbon, wherein the (D) hydrocarbon is at least one selected from the group consisting of the following (I), (II) and (III-2):

(I) liquid hydrocarbons with a kinematic viscosity of 5.0 mm$^2$/s or greater at 30° C., (II) solid hydrocarbons other than crystalline olefin polymers, and (III-2) polyolefin waxes.

6. A method for storing an olefin polymerization catalyst, whereby an olefin polymerization catalyst comprising (A) a cocatalyst component wherein a non-coordinating ion-containing compound is chemically bonded to a fine particulate carrier, (B) a metallocene compound and (C) organometallic compound is stored in (D) a hydrocarbon, wherein the (D) hydrocarbon is at least one selected from the group consisting of the following (I) to (III):

(I) liquid hydrocarbons with a kinematic viscosity of 5.0 mm$^2$/s or greater at 30° C., (II) solid hydrocarbons other than crystalline olefin polymers, and (III) crystalline olefin polymers.

7. A method for storing an olefin polymerization catalyst component, whereby an olefin polymerization catalyst component comprising (A) a cocatalyst component wherein a non-coordinating ion-containing compound is chemically bonded to a fine particulate carrier and (B) a metallocene compound is stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers.

8. A process for producing an olefin polymer whereby propylene is homopolymerized or copolymerized with one or more other olefins using an olefin polymerization catalyst comprising (A) a cocatalyst component wherein a non-coordinating ion-containing compound is chemically bonded to a fine particulate carrier, (B) a metallocene compound, (C) an organometallic compound and (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, to produce a propylene polymer with a weight-average molecular weight of 50,000 or greater.

9. A process for producing an olefin polymer according to claim 8, wherein the (III) crystalline olefin polymers are one or more selected from the group consisting of the following (III-1) and (III-2):

(III-1) those wherein at least one olefin is prepolymerized by the olefin polymerization catalyst composed of (A), (B) and (C), or when the olefin is propylene, it is prepolymerized in a medium with a melting point of 152.5° C. or below or a non-polymerizable medium, and (III-2) polyolefin waxes.

10. A process for producing an olefin polymer whereby an olefin polymer is produced by polymerizing one or more different olefins using an olefin polymerization catalyst comprising (A) a cocatalyst component wherein a non-coordinating ion-containing compound is chemically bonded to a fine particulate carrier, (B) a metallocene compound and (C) an organometallic compound, the catalyst being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers.

11. A process for producing an olefin polymer whereby a propylene polymer is produced by homopolymerizing propylene or copolymerizing propylene with at least one other olefin using an olefin polymerization catalyst comprising (A) a cocatalyst component wherein a non-coordinating ion-containing compound is chemically bonded to a fine particulate carrier, (B) a metallocene compound and (C) an organometallic compound, the catalyst being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers.

12. A process for producing an olefin polymer whereby an olefin polymer is produced by polymerizing one or more different olefins using an olefin polymerization catalyst which comprises a catalyst component comprising (A) a cocatalyst component wherein a non-coordinating ion-containing compound is chemically bonded to a fine particulate carrier and (B) a metallocene compound, the catalyst component being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, and (C) an organometallic compound.

13. A process for producing an olefin polymer whereby a propylene polymer is produced by homopolymerizing propylene or copolymerizing propylene with at least one other olefin using an olefin polymerization catalyst which comprises a catalyst component comprising (A) a cocatalyst component wherein a non-coordinating ion-containing compound is chemically bonded to a fine particulate carrier and (B) a metallocene compound, the catalyst component being stored in (D) a hydrocarbon, wherein the (D) hydrocarbon is at least one selected from the group consisting of the following (I) to (III):

(I) liquid hydrocarbons with a kinematic viscosity of 5.0 mm²/s or greater at 30° C., (II) solid hydrocarbons other than crystalline olefin polymers, and (III) crystalline olefin polymers, and (C) an organometallic compound.

* * * * *